(12) United States Patent
Buris

(10) Patent No.: US 12,455,668 B1
(45) Date of Patent: Oct. 28, 2025

(54) ENERGY EFFICIENCY OF ANTENNAS AS SENSORS (A2S) SYSTEMS

(71) Applicant: Amazon Technologies, Inc., Seattle, WA (US)

(72) Inventor: Nicholas Evangelos Buris, Chicago, IL (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/812,208

(22) Filed: Aug. 22, 2024

(51) Int. Cl.
*A61B 5/024* (2006.01)
*G06F 3/046* (2006.01)

(52) U.S. Cl.
CPC .... *G06F 3/046* (2013.01); *G06F 2203/04108* (2013.01)

(58) Field of Classification Search
CPC .......... G06F 3/046; G06F 2203/04108; A61B 5/02416
See application file for complete search history.

(56) References Cited

U.S. PATENT DOCUMENTS

2020/0268266 A1\* 8/2020 Majava ............. A61B 5/02416

\* cited by examiner

*Primary Examiner* — Abdul-Samad A Adediran

(57) ABSTRACT

Technologies directed to an energy efficient technique for Antennas as Sensors (A2S) systems used for detecting user input events are described. One electronic device includes a wireless communication component coupled to an antenna via a radio frequency (RF) path, and an RF switch selectively coupling the A2S system to the RF path. The radio sends RF signals to the antenna via the RF path in a first time window. The RF switch is controlled to selectively couple the A2S system to the RF path in the first time window. A processing device of the electronic device receives receiving an analog voltage signal representing impedance changes of the antenna in the first time window and determines, using the analog voltage signal, a user input event caused by a presence of an object in proximity to the antenna. The processing device performs an action in response to the user input event.

20 Claims, 22 Drawing Sheets

ENERGY EFFICIENCY OF ANTENNAS AS SENSORS (A2S) SYSTEMS

BACKGROUND

An increasing number of people are engaging with digital entertainment, including music, films, photos, and eBooks, using a variety of digital devices. These devices range from e-readers and smartphones to tablets and laptops. They connect wirelessly to networks for media consumption and typically feature touch-based controls for functions like playback and volume. As technology evolves, these electronic devices are becoming more widespread and popular.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
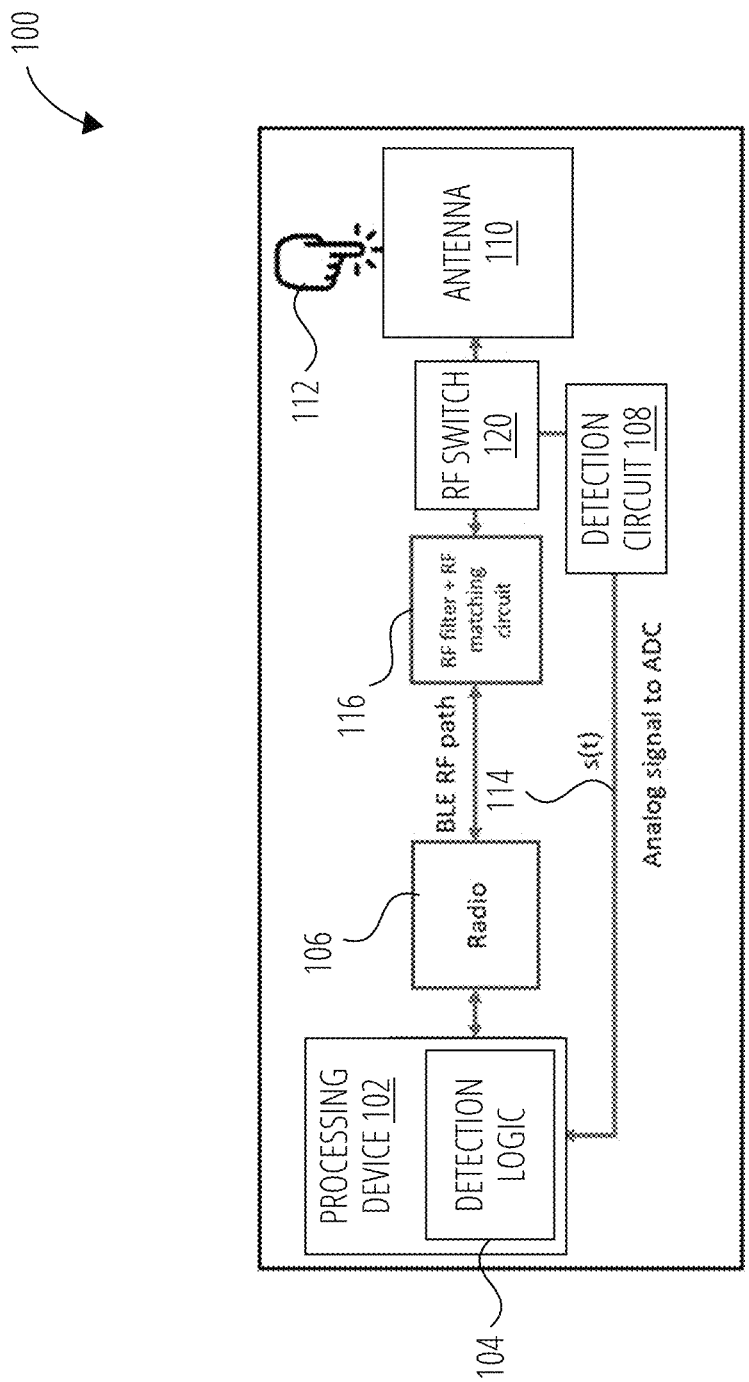
FIG. 1A is a block diagram of a wireless device with an antenna, a radio frequency (RF) switch, detection logic, and detection circuit to detect a touch event or a hover event caused by an object in proximity to the antenna according to at least one embodiment.

Technologies directed to improving energy efficiency of Antennas as Sensors (A2S) systems used for detecting user input events are described. The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

As described herein, an antenna can be used for both RF communications and as a sensor for touch sensing, referred to herein as the Antennas as Sensors (A2S) technology or A2S system. In general, a sensor is a circuit that detects and converts a physical phenomenon like temperature, pressure, or the like into a resistance change, which is converted into a measurable quantity that can quantify the impact of the physical phenomenon. A detection circuit of an A2S system can be coupled to an RF path between a radio and an antenna. The RF path can be a bi-directional path over which a wireless communication component (i.e., radio) sends and receives RF signals. A detection circuit can be implemented in a RF front end and converts the reflected signals to voltages. The detection circuit can be a low-cost option that uses a resistive-coupled topology with a Schottky envelope detection diode. The analog signals can be fed to an analog-to-digital converter (ADC) of a processing device coupled to the radio. The detection circuit can generate analog A2S signals and send them to the ADC to generate digital A2S signals (also referred to herein as impedance data), which represent changes in the impedance of the antenna. The digital A2S signals can be input into a detection algorithm that can detect various user input events, such as a touch event, a gesture event, or the like. In general, the A2S system can provide touch or gesture recognition in devices with wireless transceivers by using the antenna, a detection circuit, and a detection algorithm. These technologies provide recognition of a presence and/or motion of an object in proximity to the user, such as finger of a user. Touching a consumer device, such as smart speakers, earbuds, etc., in a certain way can be used as one type of user input as a user interface. A tap, double tap, long tap, swipe, or other physical interactions can be interpreted as user commands and set or modify the device settings according to a certain pre-agreed etiquette. Similarly, hovering interactions can also be interpreted as user commands according to certain pre-agreed etiquette.

However, when directly coupled to the RF path between the antenna and the radio, the detection circuit draws power away from transmissions by the radio. This power consumption by the detection circuit when it is not needed, i.e., during regular communication transmissions, reduces the range of the radio. As a representative example, the range of communication transmissions when inserting a detection circuit with Insertion Loss (IL) of 0.5 dB in front of the antenna, is reduced by 6%. If the inserted detection circuit has an IL of 1.0 dB, then the range is reduced by 11%. Since the detection circuit is only needed when A2S-specific transmissions are made in order to detect a user's proximity to the antenna, it is energy inefficient to have said circuit present at all times.

Aspects and embodiments of the present disclosure overcome these deficiencies and others by using and controlling an RF switch between the detection circuit and an RF path (i.e., Bluetooth RF branch path). The RF switch can connect the detection circuit to the antenna only during the A2S-specific transmissions and associated sampling. Therefore, the IL of the detection circuit affects power consumption during the A2S-specific transmissions. Equivalently, regular communication signal transmissions and receptions will suffer no power reduction, or range ramifications. This can ensure a more energy efficient implementation of A2S systems in the various types of devices.

Aspects and embodiments of the present disclosure use the antennas as sensor technology by measuring reflected power in an RF path caused by an antenna impedance change from a presence of an object in proximity to the antenna during a specified time window. Aspects and embodiments of the present disclosure can selectively insert a simple detection circuit into an RF path using an RF switch, as the detection circuit is focused on detecting variations of the antenna impedance and not precise knowledge of the value of the antenna impedance. For example, a finger touch, a palm touch, or a palm hovering around the antenna can be detected by variations of the antenna impedance and interpreted as user commands, such as pause or resume music, change a track, turn on a light, turn off a light, or the like. Touching a wireless device, such as a smart speaker or an earbud, in a certain way can be used as another user interface for interacting with the wireless device. Touch or hover events, such as a tap, a double tap, a long tap, a swipe, a tap and hold, a palm tap, a palm and hold, or the like, either touching or in close proximity to the antenna, can be interpreted as user commands. The user commands can set or modify the device settings according to specified configurations or operations. Aspects and embodiments of the present disclosure set forth apparatuses and methods for gesture detection by controlling the RF switch during the specified time window while utilizing the existing radio transmissions of the wireless devices during the specified time window.

Aspects and embodiments of the present disclosure use the normal wireless transmissions of the wireless device in specified time windows and, instead of dedicated electrodes, use the existing antenna(s) to detect a presence of an object during the specified time window. Aspects and embodiments of the present disclosure allow activation at some reasonable distance (e.g., hovering up to 4-5 cm away from the device, depending on the device). Aspects and embodiments of the present disclosure can provide a better user experience than dedicated buttons and accelerometer-based touch detection designs.

In at least one embodiment, a wireless device can include an antenna and a radio coupled to the antenna, the radio being capable of sending RF signals to the antenna to radiate electromagnetic energy to another wireless device in a first time window. The wireless device also includes a processing device coupled to the radio, the processing device including an analog-to-digital converter (ADC) and detection logic. The wireless device also includes an RF switch and a detection circuit coupled to the RF switch. The RF switch is coupled to an RF path between the antenna and radio. The RF switch can be activated in the first time window. The detection circuit can output an analog voltage signal to the ADC of the processing device to generate an A2S signal in the first time window, the A2S signal representing impedance changes of the antenna. The analog voltage signal can be based on (i.e., as a function of) an impedance value of the antenna. The ADC can sample the analog voltage signal at one or more frequencies over the first time window to obtain digital data. In particular, the ADC can sample the analog voltage signal at the multiple frequencies at a first time to obtain first digital data and at a second time to obtain second digital data. The detection logic can receive the A2S signal from the ADC. The detection logic can determine, using the A2S signal, a user input event caused by a presence of an object in proximity to the antenna. The detection logic can use the digital data to detect one or more interactions with the device over the first time window. For example, the detection logic can classify one or more physical interactions with the device over the period of time as a touch event or a gesture event. In particular, the detection logic can determine, using the first digital data, that a presence of an object in proximity to the antenna is located at a first position of the device. The detection logic can determine, using the second digital data, that the presence of the object in proximity to the antenna is located at a second position of the device. The detection logic can determine a gesture event using the first position and the second position. The processing device can perform an action in response to the touch event or gesture event. Unique antenna designs of a single antenna can be used to distinguish between a few different points. In at least one embodiment, a wireless device can include a processing device with detection logic and a detection circuit selectively coupled to an RF path between a radio and an antenna. The wireless device can measure a first voltage based on (i.e., as a function of) a first impedance value of the antenna using the detection circuit and a first RF signal being sent by the radio, and a second voltage based on (i.e., as a function of) a second impedance value of the antenna using the detection circuit and a second RF signal sent by the radio. The processing device determines a voltage difference representing a change in impedance. The processing device determines, based on the voltage difference, an occurrence of a touch event or a hover event caused by an object in proximity to the antenna. The processing device can determine that the voltage difference satisfies a criterion representing a touch event or a hover event caused by the object in proximity to the antenna. The processing device performs an action in response to the touch event or the hover event.

In at least one embodiment, the detection logic can implement a dedicated classification algorithm (e.g., pre-loaded in a System on Chip (SoC)) that classifies the physical interactions events and maps them to different actions/commands for the device according to a pre-agreed etiquette.

In various embodiments described herein, the radio transmits signals which, although part of the radio's wireless protocol, have no intention to communicate with another radio. For example, the radio can transmit Bluetooth Low Energy (BLE) non-connectable transmissions. These transmissions can be used for sensing purposes alone. These transmissions can occur over and above the normal communication transmissions of the radio to another wireless device. In other embodiments, any regular communication transmissions can be used for sensing purposes. So, sensing specific transmissions as well as re-using/re-purposing normal communication transmissions can be used for sensing purpose (i.e., sensing and communicating simultaneously).

FIG. 1A is a block diagram of a wireless device 100 with an antenna 110, an RF switch 120, detection logic 104, and detection circuit 108 to detect a touch event or a hover event caused by an object 112 in proximity to the antenna 110 according to at least one embodiment. The wireless device 100 includes a processing device 102 that includes an analog-to-digital converter (ADC) and detection logic 104. In at least one embodiment, the processing device 102 is a SoC that manages, among other things, the wireless protocol of a radio 106 (e.g., wireless communication component or radio integrated circuit (IC) or radio chip) coupled to the processing device 102 and other aspects of the behavior and operation of the wireless device 100. The processing device 102 can control operations of the radio 106 to communicate with one or more devices over one or more communication links. The radio 106 can implement the Wi-Fi® technology, the Bluetooth® technology, or both. Alternatively, the radio 106 can implement other radio technologies. The processing device 102 is coupled to the detection circuit 108, which is coupled to the RF switch 120, which is coupled to an RF path between the radio 106 and the antenna 110.

As described in more detail herein, the characteristics of the antenna 110 change when a user performs a gesture such as tap/touch/swipe/hover in close proximity to the antenna 110. Any such gesture is a time varying event. It should be noted that tap and touch pertain to contacting the device by hand at a single point. Taps are quick and could be "strong" while "touches" are softer (i.e., less forceful). A swipe is a trajectory of the hand/finger while maintaining contact with the surface of the device. A "hover" is like a tap or a touch without actually making contact with the device. Finally, the term "directional hovering" is used for a swipe that does not make contact with the device. The detection circuit 108, which is selectively inserted in the RF path by the RF switch 120, can translate the antenna's instantaneous characteristics into a time varying output signal 114, defined as s (t), which is guided to, and read by the detection logic 104. As described herein, an event detection method relies on variations of the antenna impedance (i.e., differences between being touched and not being touched). The event detection method can apply regardless of the variability from user to user, or variability from device to device. The level of the output signal 114, s (t), from the detection circuit 108 can be adjusted by the appropriate choice of its constituent components. The present embodiments are focused on enabling the functionality of single or multiple touch events or hover events, as well as complicated gestures detection, such as directional swipes, with a single antenna or multiple antennas.

When the RF switch 120 is activated/enabled, the detection circuit 108 can measure an amount of reflection signals, in an RF path between the radio 106 and the antenna 110, caused by changes in the impedance of the antenna 110. The detection circuit 108 can provide an output signal 114, s (t), to the processing device 102. The output signal 114 can be an analog voltage output signal (also referred to herein as voltage waveform, analog voltage signal, or the like) that is affected by the amount of reflection signals. The changes in impedance can be caused by the presence of an object 112 in proximity to the antenna 110. The wireless device 100 can include an ADC channel that can sample the output signal 114. The ADC can sample the output signal 114 at one or more multiple frequencies for the detection logic 104. The detection logic 104 can use the samples to determine a physical interaction with the wireless device 100 that cause the wireless device 100 to perform one or more actions.

In at least one embodiment, the detection circuit 108 is selectively inserted, by the RF switch 120, just in front of the antenna 110 in an RF path between the radio 106 and the antenna 110. The detection circuit 108 can provide the analog voltage output signal 114, s (t), which is guided to, and read by the processing device 102 via one of its embedded ADC channels. The characteristics of the antenna 110 change when it is approached by an object, such as a finger or palm of a user. Concomitantly, the output signal 114 of the detection circuit 108 changes. The detection logic 104 in the processing device 102 monitors the temporal changes in the output signal 114, s (t), and interprets the temporal changes as user commands based on a pre-determined etiquette. In at least one embodiment, the RF path also includes RF filtering and matching circuitry 116 coupled between the radio 106 and the detection circuit 108. The RF filtering and matching circuitry 116 can perform RF filtering of the RF signals and provide impedance matching between the radio 106 and the antenna 110. The presence of the detection circuit 108 in the RF path does not significantly impact the radio operations of the radio 106.

In at least one embodiment, the wireless device 100 is a smart speaker device. The smart speaker device can be configured to wirelessly communicate radio signals to and from another device. The smart speaker device includes a housing and a circuit board that is disposed within the housing. The antenna can be printed or disposed on a non-cosmetic surface (e.g., the top inside surface of the housing). This decreases the cost of the smart speaker device by shifting the design to the non-cosmetic surface of the housing, thereby eliminating the need for secondary manufacturing processes. The antenna can be printed or disposed on a cosmetic surface as well. Instead of including separate touch circuitry coupled to the antenna 110, the detection circuit 108 is coupled between the radio 106 and the antenna 110. In other embodiments, the antenna 110 can be deployed as a substitute for any mechanical or electrical button used in a device. For example, the antenna 110 can be used to turn lights on and off, turn a device on and off, change a state of the device based on the user interaction, or the like.

In at least one embodiment, the wireless device 100 is a wireless earbud (or simply an earbud). The wireless earbud can be configured to wirelessly communicate radio signals to and from an audio source for processing and playback by one or more speaker components of the wireless earbud. The wireless earbud includes a housing and a circuit board that is disposed within the housing. The antenna architecture of the wireless earbud can be printed or disposed on a non-cosmetic surface (e.g., the top inside surface of the housing) of the wireless earbud. At least some portion of a metal element serves effectively as a zero-footprint antenna. A zero-footprint antenna means there is no dedicated ground clearance on the circuit board dedicated to the antenna. This enables a highly miniaturized product. Instead of including separate touch circuitry coupled to the antenna 110, the detection circuit 108 is coupled between the radio 106 and the antenna 110. The wireless earbud can include an audio output device, such as an audio speaker, to produce/playback audio, such as voice calls, media, etc. In other embodiments, the antenna 110, the detection logic 104, and the detection circuit 108 can be deployed as a substitute for any mechanical or electrical button used in a device to turn lights on and off, turn a device on and off, change a state of the device based on the user interaction, or the like.

In at least one embodiment, the radio 106 is disposed on the circuit board and is coupled to an antenna feed (RF input or RF feed point). The radio 106 can drive the antenna 110 using one or more RF signals in an RF path. A current flow on the RF path can induce current on the antenna 110 to cause the antenna 110 to radiate electromagnetic energy. The radio 106 can also receive RF signals, received as electromagnetic energy by the antenna 110. The antenna 110 can be a monopole, a loop, a patch, a slot, or the like. The radio 106 can cause the antenna 110 to radiate and receive electromagnetic energy in a specified frequency range, such as the 2.4 GHz frequency band for wireless personal area network (WPAN) applications (e.g., Bluetooth® Classic or Bluetooth® Low Energy (BLE) technology), wireless local area network (WLAN) applications (e.g., Wi-Fi® technology), or the like. In one embodiment, an operating frequency of the radio 106 is a wide area network (WAN) frequency band (e.g., 5G, Long Term Evolution (LTE) technology, or the like).

In at least one embodiment, during the operation of the wireless device 100, the radio sends an RF signal to the antenna 110 via a first path (primary RF path) to radiate electromagnetic energy. The detection circuit 108 is located in a second path (also referred to herein as a shunt load, a trapped path, or a coupled path). The RF switch 120 can be activated to couple the second path to the first path. When the RF switch 120 is activated, the detection circuit 108 can detect and convert an amount of reflected power in the first path to a voltage waveform. The amount of reflected power is also referred to as "coupled power." The amount of reflected power in the first path varies in response to changes in impedance of the antenna 110. The ADC of the processing device 102 can convert the voltage waveform into digital data. The detection logic 104 uses the digital data to detect a change in impedance that satisfies a criterion representing a possible touch event or a possible hover event caused by a presence of an object 112 in proximity to the antenna 110. For example, the change in impedance can exceed a first threshold. The detection logic 104 can also use the digital data, sampled at multiple frequencies, to classify one or touches over a period of time as a gesture event (or a touch event). The gesture event can be a directional swipe gesture, a multi-directional swipe gesture, or the like.

In at least one embodiment, the processing device 102 can perform an action in response to the touch event or the hover event. In at least one embodiment, the action is at least one of starting an audio file, stopping an audio file, pausing playback of the audio file, resuming playback of the audio file, changing playback of a subsequent audio file in a list or a previous audio file in the list, increasing a volume, or decreasing the volume.

In at least one embodiment, the detection logic 104 is firmware executed by the processing device 102. The firmware can use the ADC readings to detect different use cases described herein. In at least one embodiment, the detection logic 104 is a hardware, such as a state machine of the processing device 102. In at least one embodiment, the detection logic 104 is combination logic. In at least one embodiment, the detection logic 104 is a detection algorithm. The detection algorithm can be implemented using processing logic comprising hardware, software, firmware, or any combination thereof.

In at least one embodiment, the antenna 110 of the radio 106 is made to communicate with other radios at relatively far distances. So, they are typically placed at such a location on a device so that they can radiate efficiently and be manufacturable at an appropriate cost. The antenna 110 can also be placed at a location so as to also provide an ergonomically convenient user interface for the purpose of gesture detection. In some embodiments, if only simple gestures, such as touch or mere proximity (e.g., hovering over), are sought, any existing antenna could work, with minimal modifications, if any, provided the antenna 110 is placed at the desired location for the detection of the touch/hover events. In other embodiments, specific antenna designs can enable more complicated gestures, such as swipes. Yet, other antenna designs enable the detection of gestures at several, distinguishable points.

In at least one embodiment, the wireless device 100 can detect changes in impedance to detect a touch event, a hover event, or a gesture event, caused by an object 112 (e.g., object) in proximity to the antenna 110. The wireless device 100 can include RF front-end circuitry, including the RF filtering and matching circuitry 116 and the detection circuit 108. The detection circuit 108 can measure an amount of reflection signals in the RF front-end circuitry. The variations in reflection signals can be caused by changes in the impedance of the antenna 110. The detection circuit 108 can provide an analog signal (output signal 114) to the processing device 102. The analog signal can be an analog voltage output signal that represents the amount of reflection signals. The changes in impedance can be caused by the presence of an object in proximity to the antenna 110. The processing device 102 can include an ADC that can sample the analog signal to obtain digital data or samples of amplitude or gain values of the analog signal at a specified frequency. The processing device 102 can sample the output signal 114 at one or more multiple frequencies for the detection logic 104. The detection logic 104 can use the samples to determine a physical interaction with the wireless device 100 that cause the wireless device 100 to perform one or more actions.

In at least one embodiment, the processing device 102 cause the radio 106 to send, at a first time, a first RF signal to the antenna 110 to radiate electromagnetic energy at a first frequency. At the first time, the processing device 102 can measure a first voltage based on a first impedance value of the antenna 414 using the detection circuit 108 and the first RF signal. At a second time, the processing device 102 cause the radio 106 to send a second RF signal to the antenna 110 to radiate electromagnetic energy at a second frequency. At the second time, the processing device 102 measures a second voltage based on a second impedance value of the antenna 110 using the detection circuit 108 and the second RF signal. The processing device 102 can determine, using at least the first voltage and the second voltage, a change in impedance that satisfies a criterion representing a touch event or a hover event caused by an object in proximity to the antenna 110. The processing device 102 performs an action in response to the touch event or the hover event. The action can be any one of the following actions: starting an audio file; stopping an audio file; pausing playback of the audio file; resuming playback of the audio file; changing playback of a subsequent audio file in a list or a previous audio file in the list; increasing a volume; decreasing the volume, or the like. In at least one embodiment, the touch event is at least one of a tap, a double tap, a tap and hold, a swipe, a palm tap and hold, or the like. In other embodiments, some or all of these operations are performed by the detection logic 104.

In at least one embodiment, the processing device 102 cause the radio 106 to send, at a first time, a first RF signal to the antenna 110 to radiate electromagnetic energy at a first frequency. At the first time, the processing device 102 can measure a first voltage based on a first impedance value of the antenna 414 using the detection circuit 108 and the first RF signal. The processing device 102 can sample the first voltage at a set of frequencies. At a second time, the processing device 102 cause the radio 106 to send a second RF signal to the antenna 110 to radiate electromagnetic energy at a second frequency. At the second time, the processing device 102 measures a second voltage based on a second impedance value of the antenna 110 using the detection circuit 108 and the second RF signal. The processing device 102 can sample the second voltage at the set of frequencies. The processing device 102 can determine a touch point from the sampled first voltage and a second touch point from the sampled second voltage. The processing device can determine, from the first and second touch points, a touch event or a gesture event caused by an object in proximity to the antenna 110. The processing device 102 performs an action in response to the touch event or the gesture event. The action can be any one of the following actions: starting an audio file; stopping an audio file; pausing playback of the audio file; resuming playback of the audio file; changing playback of a subsequent audio file in a list or a previous audio file in the list; increasing a volume; decreasing the volume, or the like. In at least one embodiment, the touch event is at least one of a tap, a double tap, a tap and hold, a swipe, a palm tap and hold, or the like. In other embodiments, some or all of these operations are performed by the detection logic 104.

In at least one embodiment, the radio 106 sends the first RF signal in an advertising channel of a wireless personal area network (WPAN) protocol. In at least one embodiment, the first RF signal is included in an advertising channel of the Bluetooth Low Energy (BLE) standard. In at least one embodiment, the radio 106 sends the first RF signal in a first advertising channel of the WPAN protocol and the second RF signal in a second advertising channel of the WPAN protocol. In at least one embodiment, the first RF signal is included in a first advertising channel of the BLE standard, and the second RF signal is included in a second advertising channel of the BLE standard. It should be noted that technologies described herein could be applied to many transmitting radios. A BLE radio is a low-cost solution amongst the typical radios deployed in wireless devices. It should also be noted that the technologies described herein are directed to touch and gesture recognition while transmitting data on the antenna 110. In some cases, different features could be used to accommodate touch and gesture recognition while receiving data on the antenna 110.

In at least one embodiment, the detection circuit 108 measures the first voltage by detecting an amount of reflection coefficient of the antenna 110 (i.e., reflected power in the first path). The detection circuit 108 can convert the amount of reflected power to a voltage waveform. The amount of reflected power in the first path varies in response to changes in impedance of the antenna 110. The processing device 102 can convert, using the ADC, the voltage waveform into digital data. In at least one embodiment, the detection circuit 108 measures the first voltage by detecting an amount of reflection coefficient of the antenna 110 coupled to a radio in a first path using a detection circuit 108. The detection circuit 108 generates, using the amount of reflection coefficient, the voltage waveform. The amount of reflection coefficient varies in response to changes in impedance of the antenna 110. Although various embodiments described herein are directed to a single object being detected, in other embodiments, the antenna 110, the detection logic 104, and the detection circuit 108 can detect and classify multiple objects concurrently or simultaneously, such as multi-finger touches or sequence of touches. These can be used for more advance gestures. That is simultaneous touches can have different signal signatures, permitting more complex gestures. These touches can be simultaneous touches, concurrent touches, or sequential touches in a predetermined order. Also, the event of touching two or more points simultaneously (e.g., touching with two fingers) can have a unique signature and, therefore, can be distinguishable from other touch events, and is itself a legitimate touch event.

Figure 1B:
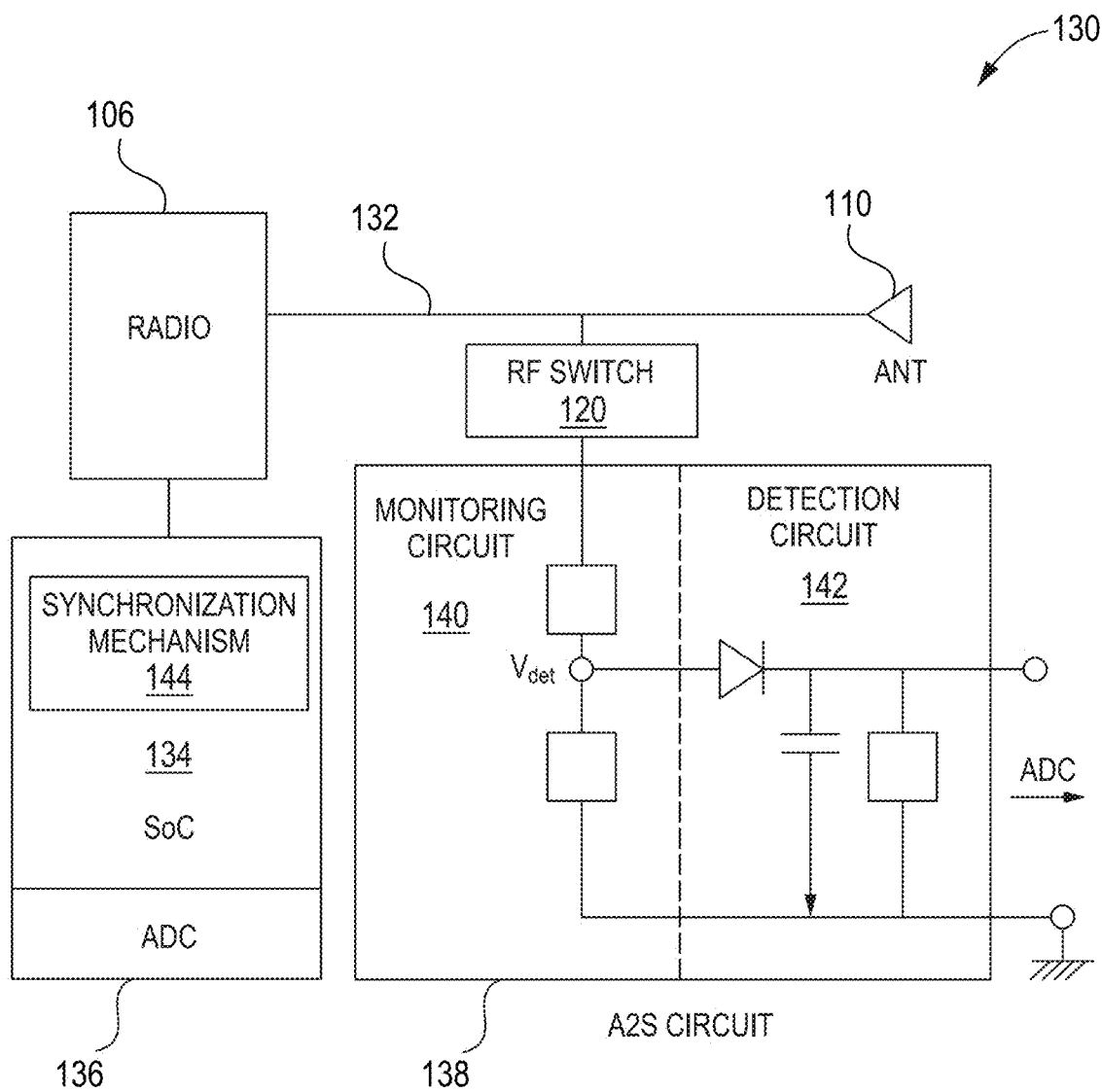
FIG. 1B is a block diagram of a wireless device with a radio, an antenna, an RF switch coupled between an RF path and an A2S circuit to detect a touch event or a hover event caused by an object in proximity to the antenna according to at least one embodiment.

FIG. 1B is a block diagram of a wireless device 130 with a radio 106, an antenna 110, an RF switch 120 coupled between an RF path 132 and an A2S circuit 138 to detect a touch event or a hover event caused by an object in proximity to the antenna 110 according to at least one embodiment. In this embodiment, the wireless device 130 is similar to the wireless device 100 as noted by similar reference numbers. The radio 106 is coupled to the antenna 110 via the RF path 132. The RF switch 120 is coupled between the RF path 132 and the A2S circuit 138. The A2S circuit 138 can include a monitoring circuit 140 and a detection circuit 142. The wireless device 130 also includes a SoC 134, including an ADC 136. The A2S circuit 138 only draws power from signal transmissions, such as A2S-specific transmissions, when the RF switch 120 is activated, as opposed to drawing power from all signal transmissions, including regular communications, A2S-specific transmissions. The A2S-specific transmissions can be non-connectable "advertising" transmissions, such as transmitted by BLE radios in the BLE standard. These non-connectable "advertising" transmissions can be specifically generated for the A2S circuit 138 for detecting an object.

In this embodiment, the RF switch 120 is coupled between the monitoring circuit 140 and the RF path 132 to the antenna 110. The SoC 134 can include a synchronization mechanism 144 to synchronize operation of the RF switch 120 with specified transmissions (i.e., A2S specific transmissions) by the wireless communication component and associated sampling of the analog voltage signal, $V_{det}$, by the ADC 136. In at least one embodiment, the RF switch 120 is controlled and synchronized by the SoC 134 and/or the radio 106 (so as to be in the "closed" state only during the A2S specific transmissions and the associated sampling by the ADC 136 of the envelope of the A2S voltage signal, $V_{det}$. In at least one embodiment, the A2S specific transmissions can be advertisement packets that are already being transmitted by the radio 106. In other embodiments, the radio 106 can have certain modes, such as modes to test signals or perform health checks. These modes can send RF signals that are not really meant to communicate with another device. The specified transmissions in these modes can be used as A2S specific transmissions. In other embodiments, the radio 106 can have a continuous wave (CW) mode that can be used for A2S purposes. In other embodiments, the SoC 134 can indicate the specified transmissions to be sent by the radio 106 for A2S purposes.

Figure 1C:
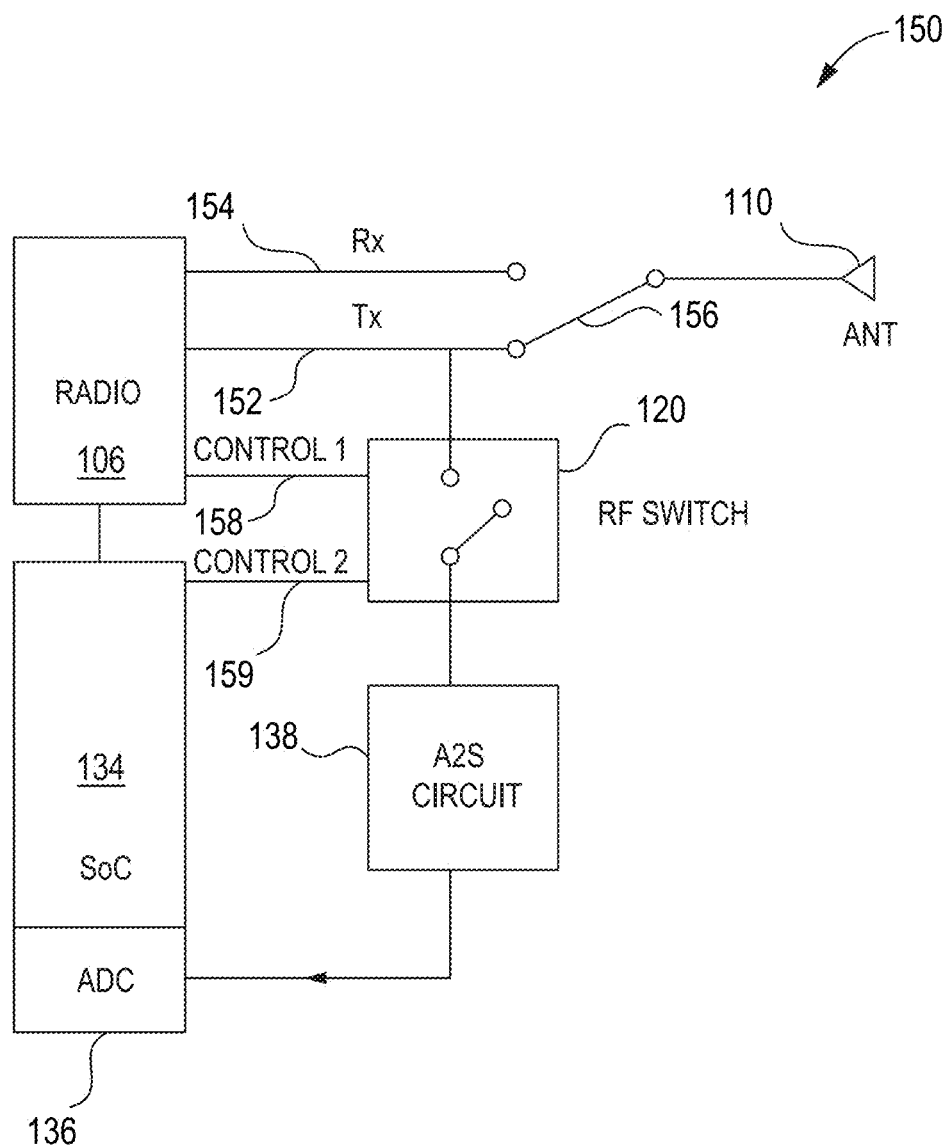
FIG. 1C is a block diagram of a wireless device with a radio, an antenna, an RF switch coupled between an transmit (TX) path and an A2S circuit to detect a touch event or a hover event caused by an object in proximity to the antenna according to at least one embodiment.
Figure 1D:
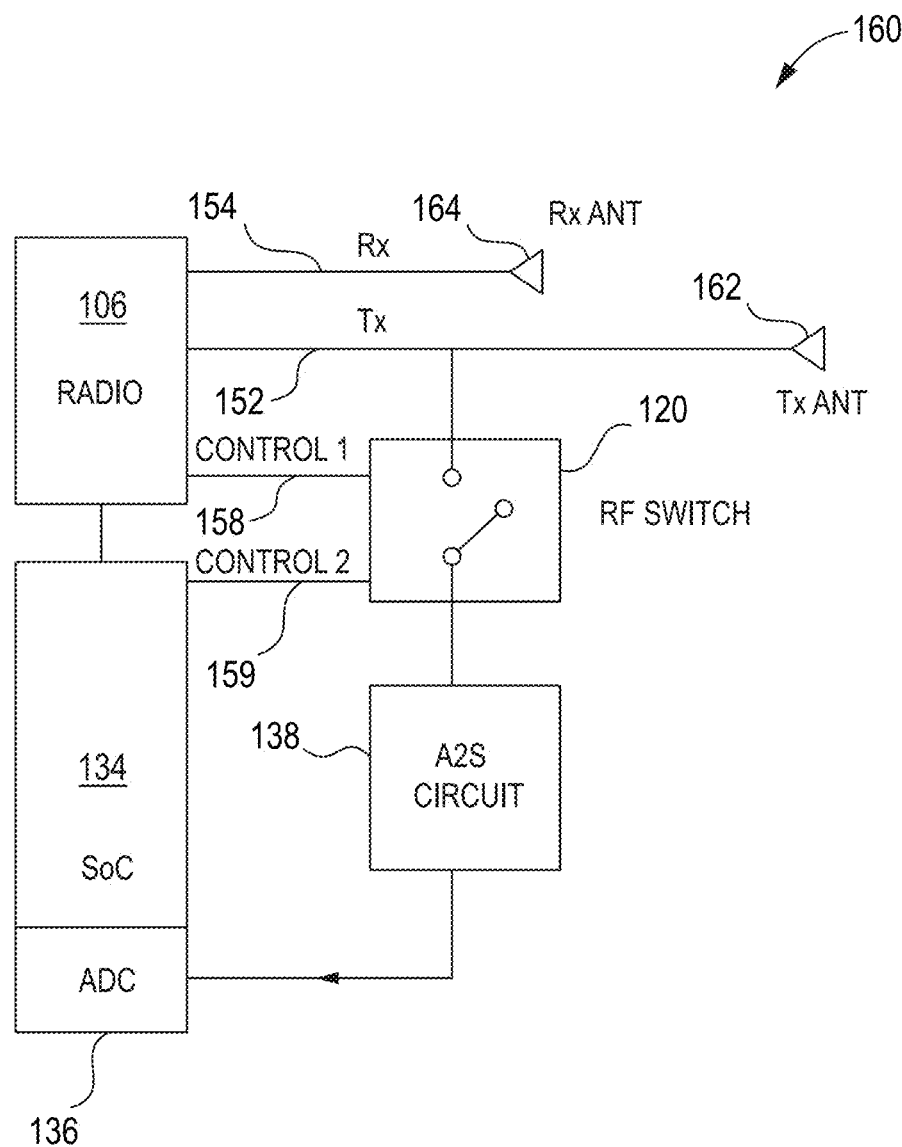
FIG. 1D is a block diagram of a wireless device with a radio, a TX antenna, a receive (RX) antenna, an RF switch coupled between an TX path and an A2S circuit to detect a touch event or a hover event caused by an object in proximity to the antenna according to at least one embodiment.
Figure 1E:
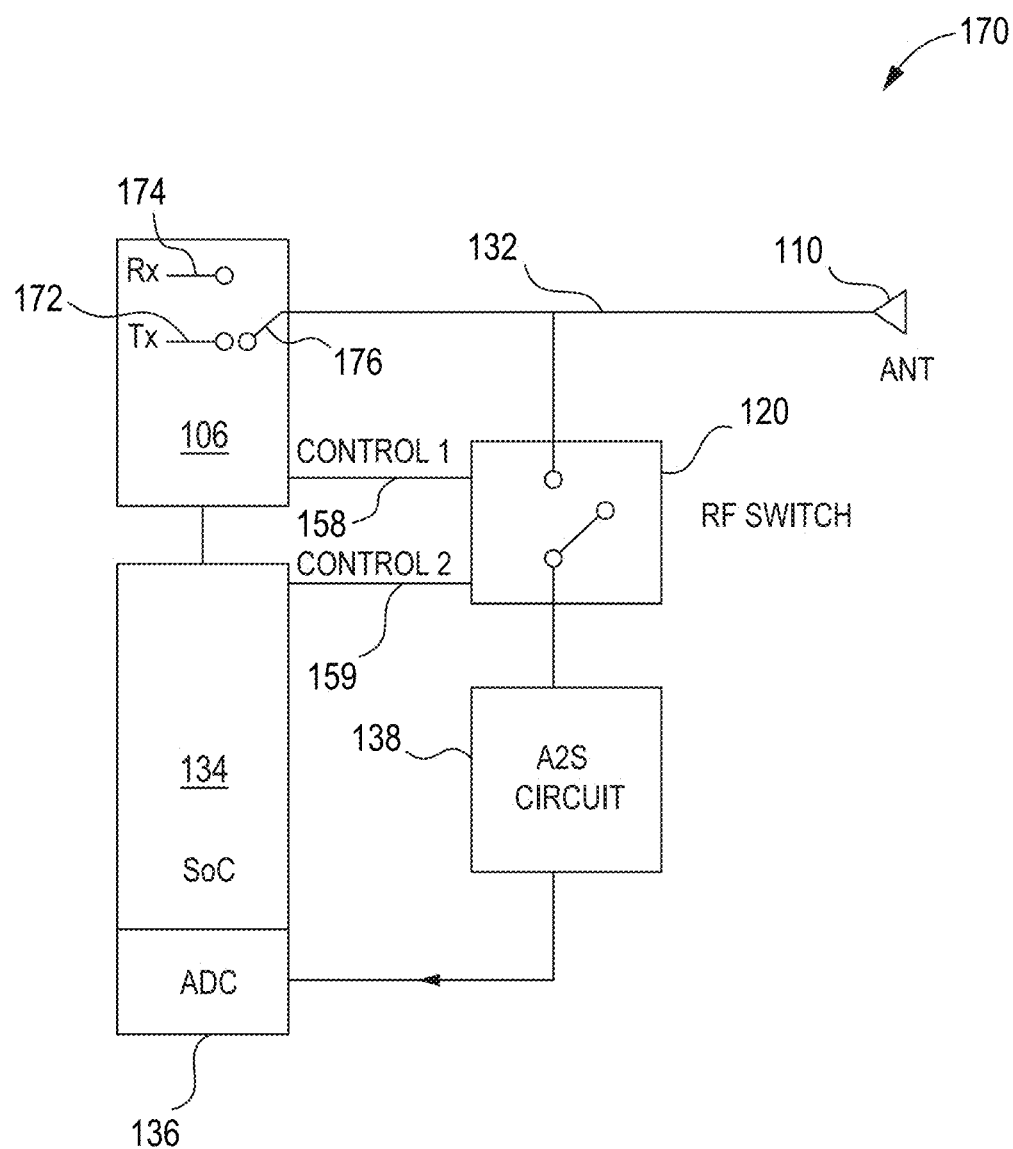
FIG. 1E is a block diagram of a wireless device with a radio with internal TX and RX paths, an antenna, an RF switch coupled between an RF path and an A2S circuit to detect a touch event or a hover event caused by an object in proximity to the antenna according to at least one embodiment.

There are various architectural options in deploying A2S, such as depicted in FIG. 1C, FIG. 1D, and FIG. 1E. In FIG. 1C and FIG. 1D, the A2S circuit 138 and its associated IL only affect the TX path of the radio 106. This means that any and all transmissions from the radio 106 to the antenna 110 will have some of their power reduced by the IL of the A2S circuit 138. But the A2S signal, $V_{det}$, is of use for user gesture detection only during A2S specific transmissions. Namely, in one implementation example, non-connectable "advertising" transmissions in BLE radios which are specifically generated for A2S. This means that, without the proposed RF switch 120, even regular communication transmissions will lose some power to the IL of the A2S circuit 138. As set forth herein, the SoC 134 and/or the radio 106 can open/close the RF switch 120 via one or more control lines, so that the A2S circuit 138 is connected to the antenna only when it is needed. That is, only when it transmits signals intended to be monitored and sampled by the ADC 136 in order to assess whether a user has touched, or come in close proximity of the antenna 110. Using this scheme, the A2S circuit 138 has no effect whatsoever to the regular communication signal transmissions of the radio 106. As such, it does not consume any excess power and it does not have any effect on the range of the radio 106.

FIG. 1C is a block diagram of a wireless device 150 with a radio 106, an antenna 110, an RF switch 120 coupled between a TX path 152 and an A2S circuit 138 to detect a touch event or a hover event caused by an object in proximity to the antenna 110 according to at least one embodiment. The wireless device 150 is similar to the wireless device 100 as noted by similar reference numbers. The radio 106 is coupled to the antenna 110 via a TX path 152 or an RX path 154, as controlled by an RF switch 156 (also referred to as a RX/RX switch). The TX path 152 and RX path 154 can be coupled to the RF switch 156 to share a common RF path to the antenna 110. In this embodiment, the RF switch 156 (TX/RX switch) is external to the radio 106. In this embodiment, the RF switch 120 is coupled to the TX path 152, closer to the radio 106 than the RF switch 156, and the A2S circuit 138. The RF switch 120 can be controlled by a first control signal 158 from the radio 106, a second control signal 159 from the SoC 134, or both.

FIG. 1D is a block diagram of a wireless device 160 with a radio 106, a TX antenna 162, an RX antenna 164, an RF switch 120 coupled between a TX path 152 and an A2S circuit 138 to detect a touch event or a hover event caused by an object in proximity to the antenna according to at least one embodiment. The wireless device 160 is similar to the wireless device 100 as noted by similar reference numbers. The radio 106 is coupled to the TX antenna 162 via a TX path 152 and the RX antenna 164 via an RX path 154. In this architecture, the radio 106 has independent TX and RX branches and antennas. In this embodiment, the RF switch 120 is coupled between the TX path 152 and the A2S circuit 138. The RF switch 120 can be controlled by a first control signal 158 from the radio 106, a second control signal 159 from the SoC 134, or both.

Figure 1F:
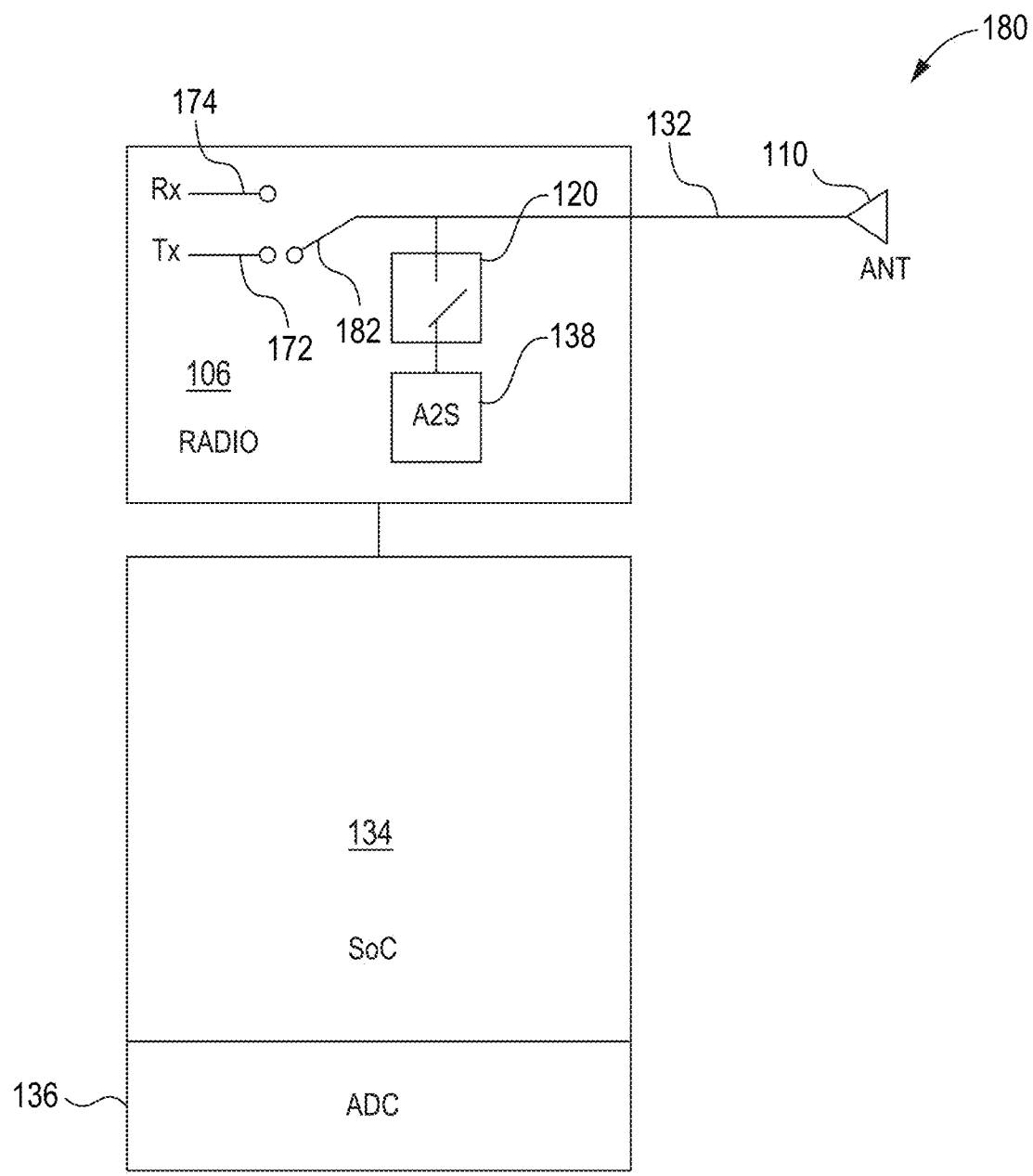
FIG. 1F is a block diagram of a wireless device with a radio having an RF switch and A2S circuit, where the RF switch is coupled to an RF path of the radio to detect a touch event or a hover event caused by an object in proximity to the antenna according to at least one embodiment.
Figure 1G:
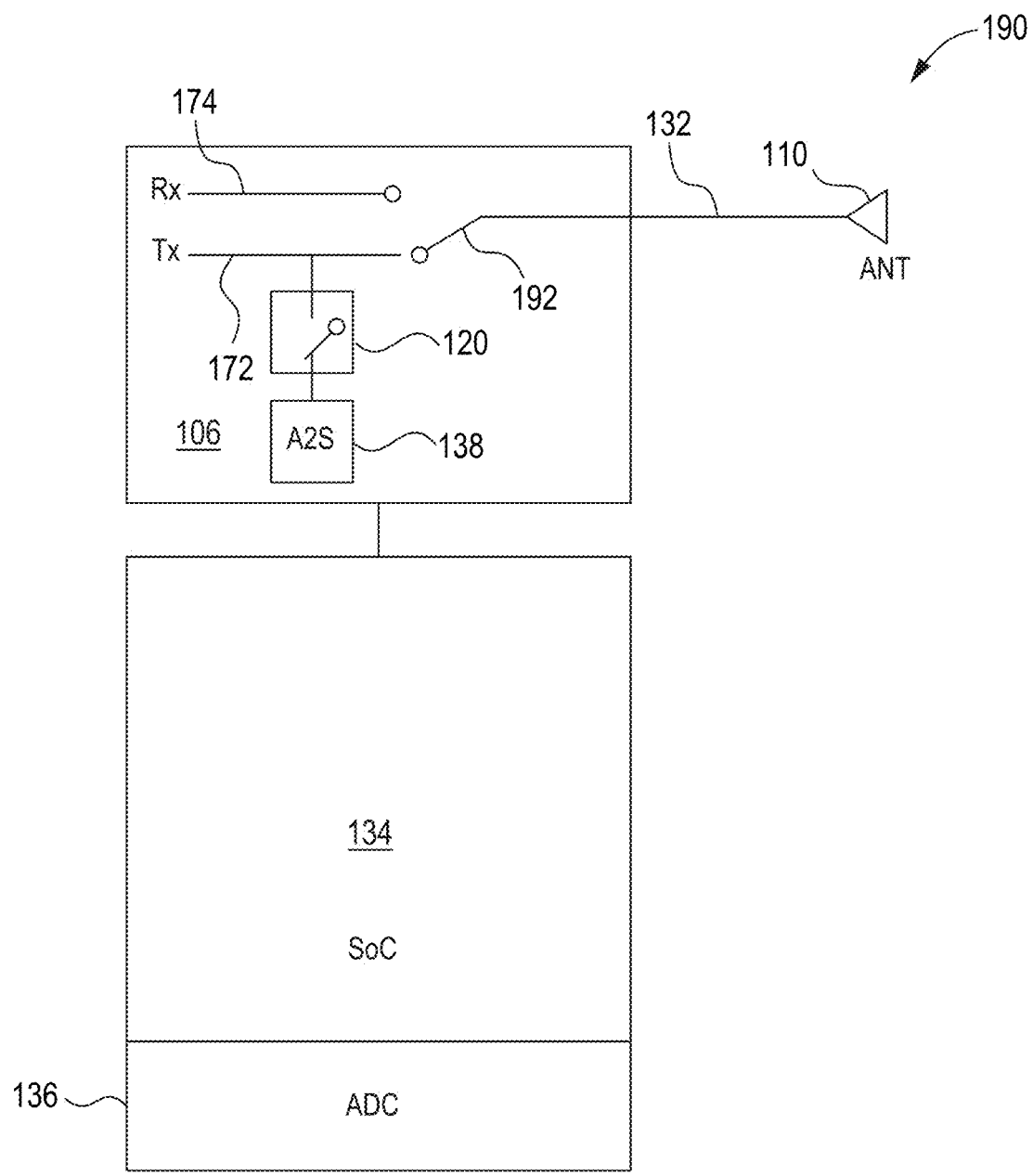
FIG. 1G is a block diagram of a wireless device with a radio having an RF switch and A2S circuit, where the RF switch is coupled to an TX path of the radio to detect a touch event or a hover event caused by an object in proximity to the antenna according to at least one embodiment.

There are various architectural options in deploying A2S, such as depicted in FIG. 1E, FIG. 1F, and FIG. 1G. In FIG. 1E, both the TX and RX paths are affected by the IL of the A2S circuit 138. So, without the RF switch 120, not only the transmitted signals, but the received signals also will get attenuated by the IL of the A2S circuit 138. This case suffers a larger performance degradation due to the presence of the A2S circuit 138. However, using the RF switch 120 renders the communication traffic, be it TX or RX, completely unaffected of the A2S circuit 138 and its insertion loss. By virtue of the RF switch 120, controlled by the SoC 134 and/or radio 106, the A2S circuit 138 is connected to the antenna 110 only when A2S specific transmissions are generated. The architecture of FIG. 1E, the TX/RX switch of the radio 106 is internal to the 106 (i.e., radio chip). In FIG. 1F and FIG. 1G, the RF switch 120 and A2S circuit 138 can be implemented directly inside the radio chip (e.g., radio 106). Either architecture shown in FIG. 1F and FIG. 1G could be used depending on convenience. Although these embodiments show a single antenna 110, in other embodiments, multiple antennas can be used, such as a TX antenna and an RX antenna for the respective TX and RX paths.

FIG. 1E is a block diagram of a wireless device 170 with a radio 106 with internal TX path 172 and RX path 174, an antenna 110, an RF switch 120 coupled between an RF path 132 and an A2S circuit 138 to detect a touch event or a hover event caused by an object in proximity to the antenna according to at least one embodiment. The wireless device 170 is similar to the wireless device 100 as noted by similar reference numbers. The radio 106 is coupled to the antenna 110 via a TX path 152 or an RX path 154, as controlled by an RF switch 176 (also referred to as a RX/RX switch). The TX path 152 and RX path 154 can be coupled to the RF switch 156 to share a common RF path 132 to the antenna 110. In this embodiment, the RF switch 176 (TX/RX switch), the TX path 172, and RX path 174 are internal to the radio 106. In this embodiment, the RF switch 120 is coupled between the RF path 132 and the A2S circuit 138. The RF switch 120 can be controlled by a first control signal 158 from the radio 106, a second control signal 159 from the SoC 134, or both.

FIG. 1F is a block diagram of a wireless device 180 with a radio 106 having an RF switch 120 and A2S circuit 138, where the RF switch 120 is coupled to an RF path 132 of the radio 106 to detect a touch event or a hover event caused by an object in proximity to the antenna 110 according to at least one embodiment. The wireless device 180 is similar to the wireless device 100 as noted by similar reference numbers. The radio 106 is coupled to the antenna 110 via a TX path 172 or an RX path 174, as controlled by an RF switch 182 (also referred to as a RX/RX switch). The TX path 172 and RX path 174 can be coupled to the RF switch 182 to share a common RF path 132 to the antenna 110. In this embodiment, the RF switch 182 (TX/RX switch), the TX path 172, and RX path 174 are internal to the radio 106. In this embodiment, the RF switch 120 and the A2S circuit 138 are part of the radio 106. The RF switch 120 is coupled between the RF path 132 and the A2S circuit 138 within the radio 106. The RF switch 120 can be controlled by an internal control signal from the radio 106, an external control signals from the 134, or both.

FIG. 1G is a block diagram of a wireless device 190 with a radio 106 having an RF switch 120 and A2S circuit 138, where the RF switch 120 is coupled to a TX path 172 of the radio 106 to detect a touch event or a hover event caused by an object in proximity to the antenna 110 according to at least one embodiment. The wireless device 190 is similar to the wireless device 100 as noted by similar reference numbers. The radio 106 is coupled to the antenna 110 via a TX path 172 or an RX path 174, as controlled by an RF switch 192 (also referred to as a RX/RX switch). The TX path 172 and RX path 174 can be coupled to the RF switch 192 to share a common RF path 132 to the antenna 110. In this embodiment, the RF switch 192 (TX/RX switch), the TX path 172, and RX path 174 are internal to the radio 106. In this embodiment, the RF switch 120 and the A2S circuit 138 are part of the radio 106. The RF switch 120 is coupled between the TX path 172 and the A2S circuit 138 within the radio 106. The RF switch 120 can be controlled by an internal control signal from the radio 106, an external control signals from the 134, or both.

It should be noted that the gesture detection algorithms, such as those described herein, are not affected by the presence of the proposed RF switch 120. Also, any antenna capable of sensing a gesture as per the A2S cases can be used in connection with the RF switch 120. Broadly speaking, any antenna which is designed and placed in the product so that the user can affect its characteristics by approaching it (e.g., touching it, or coming to close proximity with it) is suitable. The benefit of the proposed RF switch 120 is that the Insertion Loss of the A2S detection circuit impedes the battery life of the radio only during the A2S specific transmissions and their associated sampling. This is significantly more efficient than having the A2S circuit affecting both power and range during regular communications signaling.

Referring back to FIG. 1A, in at least one embodiment, the detection circuit 108 can include a resistive-coupled circuit to detect an impedance of the antenna 110, such as described in more detail below with respect to FIG. 2. In at least one embodiment, the detection circuit 108 includes the components of the detection circuit 200. Alternatively, other detection circuits can be used to translate the antenna's instantaneous characteristics into the time varying output signal 114, defined as s (t).

Figure 2:
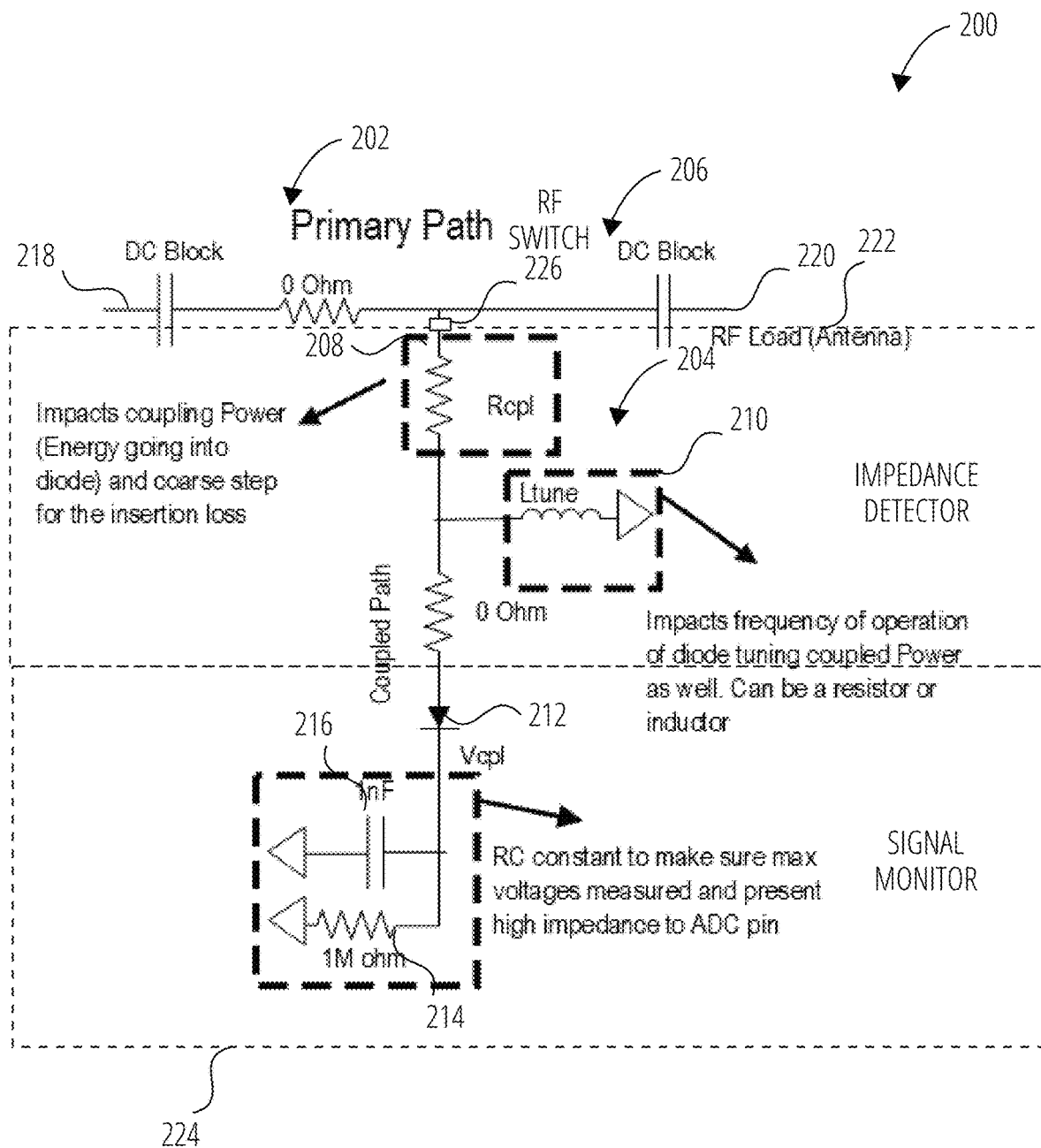
FIG. 2 is a schematic diagram of an RF switch that selectively couples a detection circuit to an RF path to detect and convert an amount of reflected power in the RF path to a voltage waveform according to at least one embodiment.

FIG. 2 is a schematic diagram of an RF switch 226 that selectively couples a detection circuit 200 to an RF path 202 (also referred to as primary path or first path) to detect and convert an amount of reflected power in the RF path 202 to a voltage waveform according to at least one embodiment. The RF path 202 is between an RF input 218 and an RF load 220 (antenna 110). The RF path 202 can include direct current (DC) blocks and an optional resistor. The optional resistor is illustrated as zero ohms, but the resistor can have other resistances based on design considerations. As described herein, the amount of reflected power in the RF path 202 varies in response to changes in impedance of an RF load 220 (antenna 110). In at least one embodiment, the detection circuit 200 includes a shunt load in front of the RF load 220 (antenna 110) and an envelope detection diode circuit. As described herein, during a specified time window, the RF switch 226 is enabled/activated, coupling the detection circuit 200 as a shunt load in front of the RF load 220. The detection circuit 200 can detect and convert the amount of reflected power in the RF path 202 to the voltage waveform (Vcpl).

In at least one embodiment, the detection circuit 200 includes an impedance detector 222 and a signal monitor 224. The impedance detector 222 is a circuit placed in front of the antenna 110 in a shunt path (parallel path) to the RF path 202, responsive to the RF switch 120 being in a closed state (activated/enabled). As illustrated in the embodiment of FIG. 2, the impedance detector 222 includes (i) a first resistor 208 (Rcpl) that regulates an amount of power coupled in a "coupled path" 204, and (ii) an inductor 210 (Ltune) (or a third resistor (Rtune)) that adjusts an output of the signal monitor 224 in a specified frequency band. The first resistor 208 can impact a "coupled power" (i.e., energy going into signal monitor 224) and coarse step for the insertion loss. The inductor 210 (or third resistor) can impact the frequency of operation of the signal monitor 224 by tuning the coupled power as well. The signal monitor 224 is a circuit that can monitor a signal generated by the impedance detector 222. As illustrated in the embodiment of FIG. 2, the signal monitor 224 is an envelope detector diode and accompanying capacitor and resistor elements.

The impedance detector 222 can present a suitably low Insertion Loss (i.e., it draws little power away from the transmitted power). For example, the first resistor 208 can have a large resistance, such as Rcpl=300 Ohms, to present a low insertion loss in the RF path 202. The impedance detector 222 can contain circuit elements in an architecture or topology such that the signal across one or more elements is some function of the impedance of the antenna 110, Zant. For example, a balanced Wheatstone bridge or other circuits can provide a voltage signal across a resistor in the circuit, which is directly proportional to a commonly used quantity, the antenna Reflection Coefficient, $S_{11}=(Zant-Zo)/(Zant+Zo)$, where Zo is some fixed reference impedance, typically 50 Ohms. Zant and, consequently, $S_{11}$ (Reflection Coefficient), change when an object approaches the antenna. However, for the aforementioned circuits, the proportionality constant is fixed, for all frequencies, regardless of the antenna and its variations. The embodiment shown in the disclosure is simpler than the Wheatstone bridge (lower cost) but it gives us a voltage signal across the Ltune which is not as neatly proportional to Zant, or $S_{11}$. It should be noted that the impedance detector 222 does not present insertion loss when the 226 is controlled to be in an open state (i.e., deactivated/disabled).

In other embodiments, the impedance detector 222 can present two or more signals of interest to be monitored and/or compared via multiple signal monitor circuits (e.g., phase detectors).

An ideal signal monitor would not change the signal it monitors. But realistic circuits do. Such is, for example, the case with the envelope detector circuit of FIG. 2. With the diode parasitics in mind, the choice of the inductor 210 (Ltune) has been made to ensure enough power going into the diode detector. This can ensure good sensitivity in monitoring changes of the voltage signal across the inductor 210 (Ltune). For the diode to perform as an envelope detector, the value of the inductor 210 (Ltune) can be selected so that the voltage across it is low enough so as not to be "clipped" by the diode. The description above describes the physical characteristics of the impedance detector 222 and the signal monitor 224. In other embodiments, other circuits can be used to detect a change in the impedance of the antenna for detecting a presence of an object in proximity to the antenna.

On the RF path 202 (also referred to as the primary path), the voltage can include an "incident" and a "reflected" wave component. When the radio transmits a signal, the incident wave travels toward the antenna 110. The reflected wave is reflected by the antenna and travels back towards the radio. The reflected-to-incident wave ratio is the aforementioned $S_{11}$ quantity (Reflection Coefficient). When there is no reflected wave from the antenna, $S_{11}=0$, and the signal monitored by the envelope detector circuit of a Wheatstone bridge detector will be zero. However, using the impedance detector 222 of FIG. 2, the monitored signal will have a non-zero value even if $S_{11}=0$ (i.e., even if there is no reflected wave). In at least one embodiment, as illustrated in FIG. 2, the detection circuit 200 is a resistive-coupled circuit with a Schottky diode 212. The resistive-coupled circuit includes an unequal resistor divider 206 with (i) a first resistor 208 that regulates an amount of power coupled in a "coupled path" 204 (also referred to as second path or tapped path) and an insertion loss in the RF path 202. The first resistor 208 can impact a "coupled power" (i.e., energy going into Schottky diode 212) and coarse step for the insertion loss. The resistive-coupled circuit includes (ii) an inductor 210 (or a third resistor, or a combination thereof) that adjusts an output of the Schottky diode 212 (also referred to as a Schottky envelope detector diode) in a specified frequency band. The inductor 210 (or third resistor) can impact the frequency of operation of the Schottky diode 212 by tuning the coupled power as well. The Schottky diode 212 can convert an alternative current (AC) signal into a pulsating direct current (DC) signal. The resistive-coupled circuit includes a second resistor 214 and a capacitor 216, each coupled to the Schottky diode 212 and coupled in parallel to one another. The pulsating DC signal charges the capacitor 216 during positive half-cycles and discharges through the second resistor 214 during gaps between the half-cycles to obtain the envelope of the voltage waveform. The second resistor 214 and capacitor 216 provide an RC constant to make sure an accurate envelope of the voltage waveform is measured and present a high impedance to an ADC channel (i.e., ADC pin) of a processing device coupled to the output (Vcpl) of the Schottky diode 212. The ADC of the processing device can convert the voltage waveform into digital data to detect a change in impedance. As described in more detail below, the change in impedance can be determined to satisfy a criterion (e.g., exceed a first threshold) for event detection by a classifier. Satisfying the criterion can represent a possible touch event caused by a physical interaction caused by a presence of an object in proximity to the RF load 220 (antenna 110). The processing device can perform an action in response to a classification of the touch event by the classifier. It should be noted that there are other conventional circuits that can detect and measure an absolute impedance of an antenna. The embodiments described herein rely on variations of the antenna impedance for event detection. The embodiments described herein can be used in various devices in spite of the variability from user to user or device to device. The detection circuit 200 can output an output signal, s (t), to the processing device for processing by the detection logic 104. The level of the output signal, s (t), from the detection circuit 200, can be adjusted by the appropriate choice of its constituent components. FIG. 2 illustrates one embodiment of the detection circuit. Alternatively, other detection circuits can be used. Additional details of the detection logic 104 (i.e., detection algorithm) are described below with respect to FIG. 3 to FIG. 16.

Figure 3:
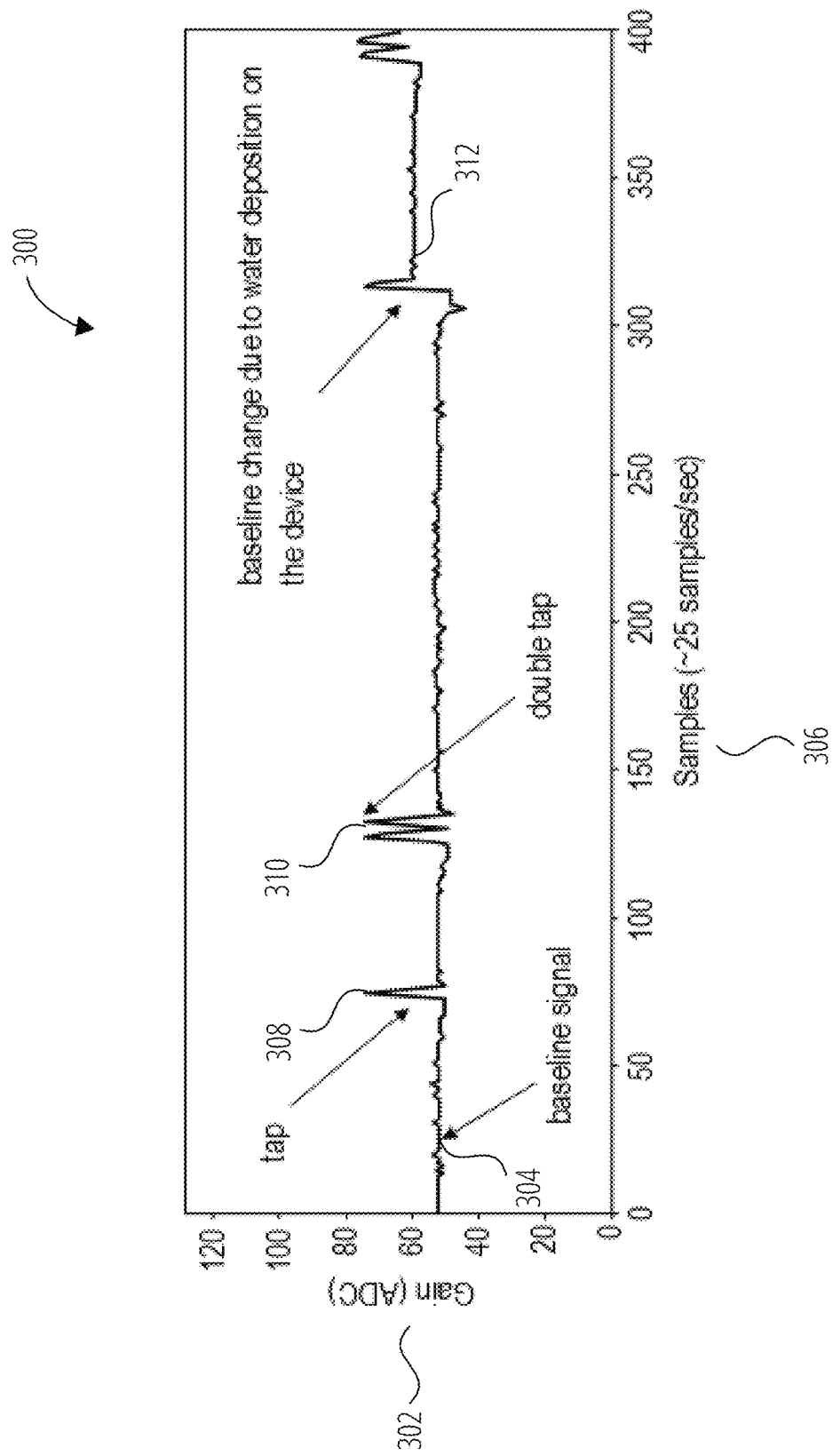
FIG. 3 is a graph illustrating an output signal of a detection circuit during normal communication transmissions of a radio according to at least one embodiment.

FIG. 3 is a graph 300 illustrating an output signal of a detection circuit during normal communication transmissions of a radio according to at least one embodiment. As described herein, the output signal can be sampled by the ADC during transmissions to produce samples 306. Each sample has a corresponding gain value 302 (also referred to as an amplitude value) measured by the detection circuit. The temporal behavior of the output signal can be used by the detection logic to establish a baseline 304 (also referred to as a baseline signal). Then monitored variations from the baseline 304 can be mapped onto suitable user gestures and interpreted as intentional user commands to alter a state and/or operation of the device. For example, as illustrated in FIG. 3, a single tap 308 on the device can result in a change in gain values 302 above the baseline 304 as a single spike. The single spike can exceed the baseline 304 by a threshold amount. For example, a single tap on an earbud during audio streaming could be detected as the tap 308 and enable a "skip track" function, a play function, a pause function, or the like. Other gestures and actions are possible. For another example, as illustrated in FIG. 3, a double tap 310 on the device can result in a change in gain values 302 above the baseline as two spikes within a specified amount of time. For example, a double tap on an earbud during audio streaming could be detected as the double tap 310 and enable a "skip track" function, a play function, a pause function, or the like.

As described herein, since the detection logic 104 relies on variations of the antenna impedance for gesture detection (instead of absolute impedance), the baseline 304 can change due to environmental or wearing conditions. For example, as illustrated in FIG. 3, the baseline 304 can experience a baseline change 312 to a higher level due to liquid deposition on the device. It should be noted that the antenna placement and sensitivity of the detection circuit can be adjusted to adjust a distance of an object can be reliably detected.

In at least one embodiment, the output signal, s (t), is sampled during normal communication transmissions of the radio. Depending on the radio, certain transmissions may be easier to handle for the purpose of gesture detection. For example, for Bluetooth Low Energy (BLE) radios, the detection logic samples the output signal, s (t), using the ADC during the advertising transmissions at one or more of the three advertising channels (i.e., 2402, 2426, and 2480 MHz). These advertising transmissions can be made during a specified time window. During the time window, the RF switch can be activated to connect the detection circuit to the RF path during these advertising transmissions. As described herein, a detection circuit is used to convert the reflected power to voltage, and this change in voltage level is used by a detection algorithm (detection logic) to map to different use cases described herein. The detection circuit can be a low-cost detection circuit. The detection circuit can be various types of topologies, including a resistive-coupled topology with a Schottky envelope detector diode. This technology can use an existing ADC in the processing device (or SoC). The detection circuit can be used in other devices with remote antennas, ring doorbell antennas with external ADCs, or the like. The impedance change that causes changes in reflected power as captured in a voltage waveform is shown and described below with respect to FIG. 4.

Figure 4:
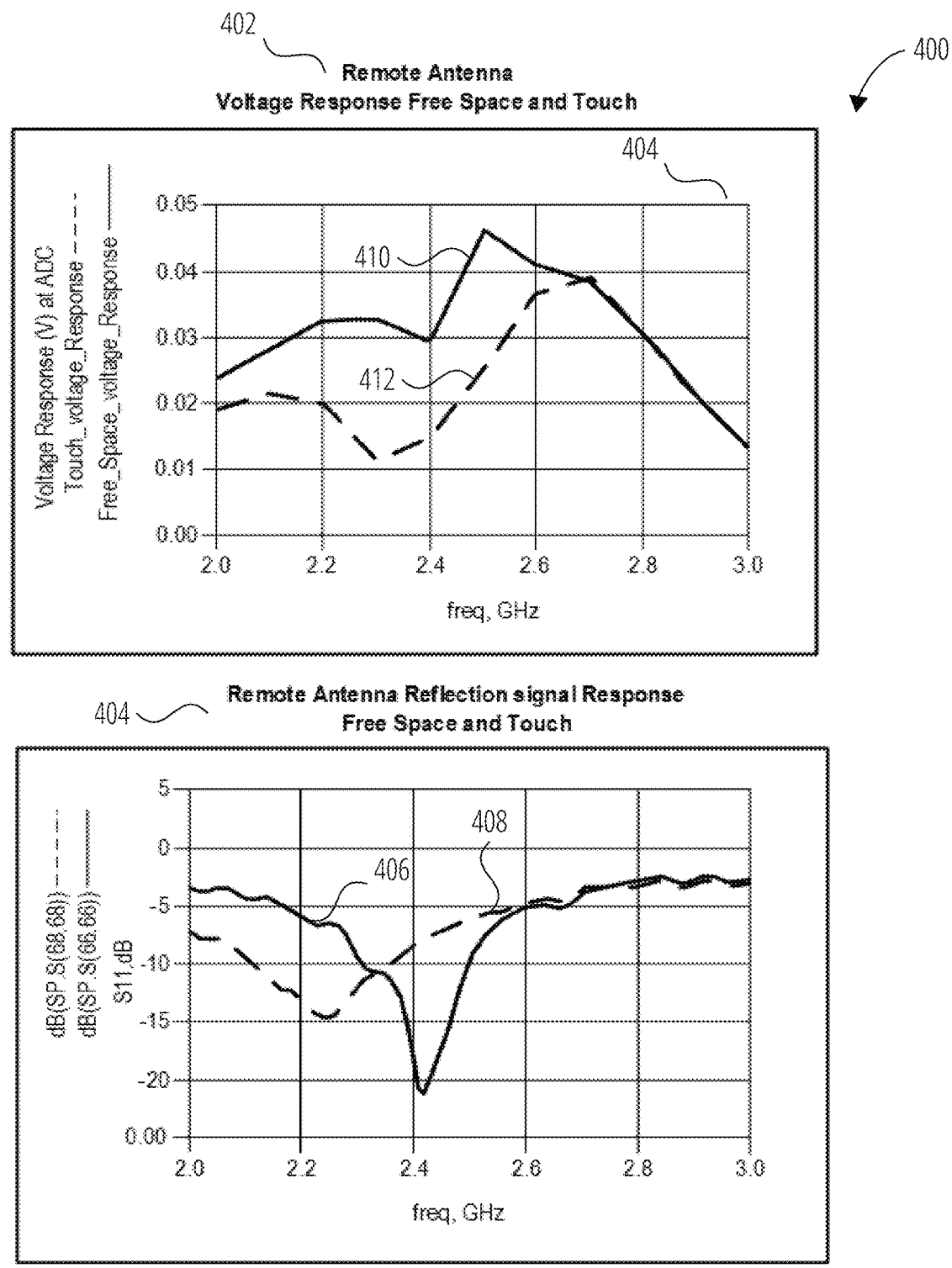
FIG. 4 illustrates graphs of a voltage response in free space and in the presence of an object using a remote antenna and a graph of a reflection signal response in free space in the presence of an object using the remote antenna according to at least one embodiment.

FIG. 4 illustrates graphs 400 of a voltage response 402 in free space and in the presence of an object using a remote antenna and a graph of a reflection signal response 404 in free space in the presence of an object using the remote antenna according to at least one embodiment. In this embodiment, a remote control device has a pigtail antenna coupled to a detection circuit inside the remote control device. When an object is not in proximity to the remote control device, a free space reflection signal response 406 is detected at the detection circuit. When the object is in proximity to or touching the remote control device, a touch reflection signal response 408 is detected at the detection circuit. The free space reflection signal response 406 and touch reflection signal response 408 can be the reflection coefficient in decibels (dBs). The change between the free space reflection signal response 406 and touch reflection signal response 408 shows the impact caused by a touch event on the remote control device. As illustrated in the free space reflection signal response 406 and touch reflection signal response 408 can be differentiated over a frequency range of approximately 2.3 GHz to 2.6 GHz.

Similarly, when an object is not in proximity to the remote control device, a free space voltage response 410 is measured at the ADC. When the object is in proximity to or touching the remote control device, a touch voltage response 412 is measured at the ADC. As illustrated in the free space voltage response 410 and touch voltage response 412 can be differentiated over a frequency range of approximately 2.0 GHz to 2.7 GHZ.

As described above, there can be a tradeoff between the insertion loss and coupled power. The amount of coupled power and, consequently, of the detection voltage depends on the antenna impedance (Zant) and varies with the variations of Zant, as shown and described below with respect to FIG. 5.

Figure 5:
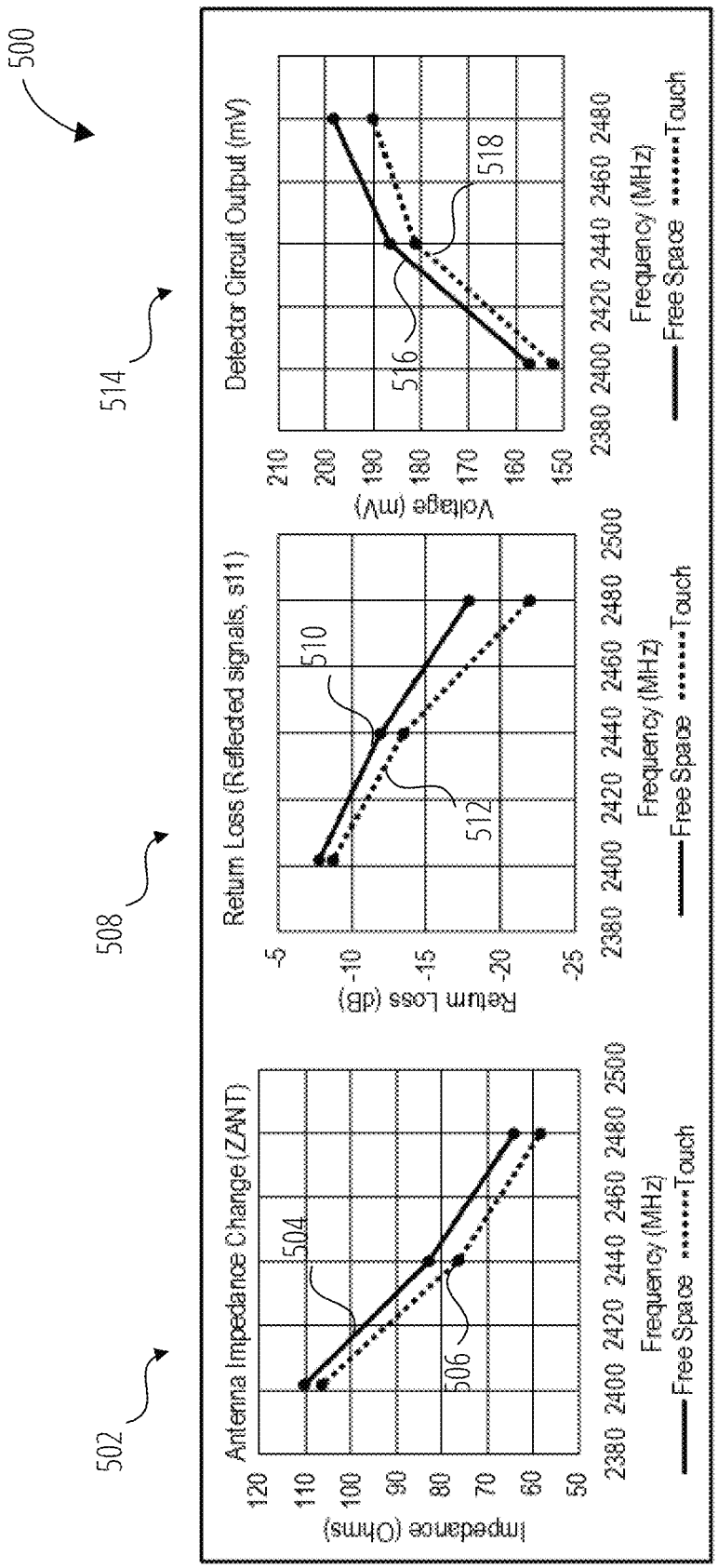
FIG. 5 illustrates graphs of antenna impedance change, return loss, and detector circuit output signals according to at least one embodiment.

FIG. 5 illustrates graphs 500 of antenna impedance change, return loss, and detector circuit output signals according to at least one embodiment. FIG. 5 shows the change in the antenna impedance due to the touch impacting the reflected power in the RF Path, which is detected at the detector output. A first graph 502 illustrates an antenna impedance magnitude change 504 (Zant) in free space versus an antenna impedance magnitude change 506 with a presence of an object. A second graph 508 illustrates a return loss 510 in free space versus a return loss 512 with a presence of an object. A third graph 514 illustrates a detector circuit output 516 in free space versus a detector circuit output 518 with a presence of an object. There can be some dependencies on the ADC. For example, the number of ADC steps and the step size determine what which gestures can be detected and differentiated.

Figure 6:
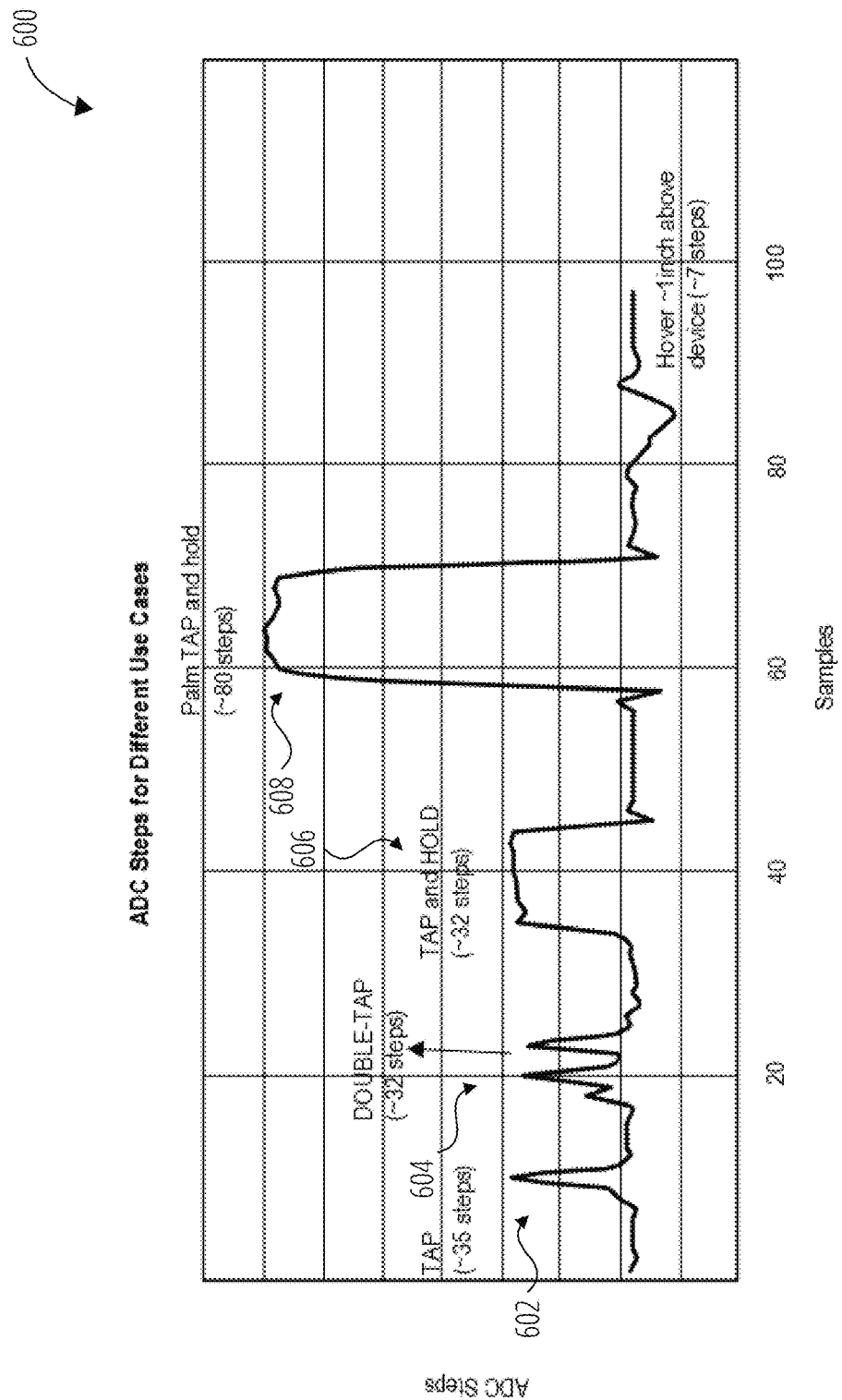
FIG. 6 is a graph showing analog-to-digital converter (ADC) steps for different use cases according to at least one embodiment.

FIG. 6 is a graph 600 showing ADC steps for different use cases according to at least one embodiment. Graph 600 includes ADC steps corresponding to a tap 602, a double tap 604, a tap and hold 606, and a palm tap and hold 608. The tap 602 is a single spike in the ADC steps. The double tap 604 has two spikes within a specified amount of time. The tap and hold 606 has a rising edge, a first level of ADC steps for a specified amount of time, and a falling edge. The palm tap and hold 608 has a rising edge, a second level of ADC steps for a specified amount of time, and a falling edge. The second level is higher than the first level. As described above, the A2S signals can be used to identify possible user input events. The A2S signals can be preprocessed and used as inputs to a neural network classifier to predict a tap gesture or a "non-tap" (i.e., any action that is not an intentional tap on the surface of the device by a user).

Additional details of using the A2S signals to detect user input events are described below with respect to FIG. 7 to FIG. 16.

Signal Preprocessing—A2S Preprocessing

In at least one embodiment, the A2S signal is acquired by transmitting periodic BLE advertisement packets. BLE advertisement packets are a standard part of the BLE protocol. The advertisement include periodic transmission of data over the antenna over three channels, such as 2402, 2426, and 2480 MHz. The A2S detection circuit (e.g., detection circuit 108, detection circuit 200) converts impedance changes of the Bluetooth antenna into a voltage which can be digitized by the ADC of the CPU (e.g., 102). A sample A2S waveform is shown in FIG. 7.

Figure 7:
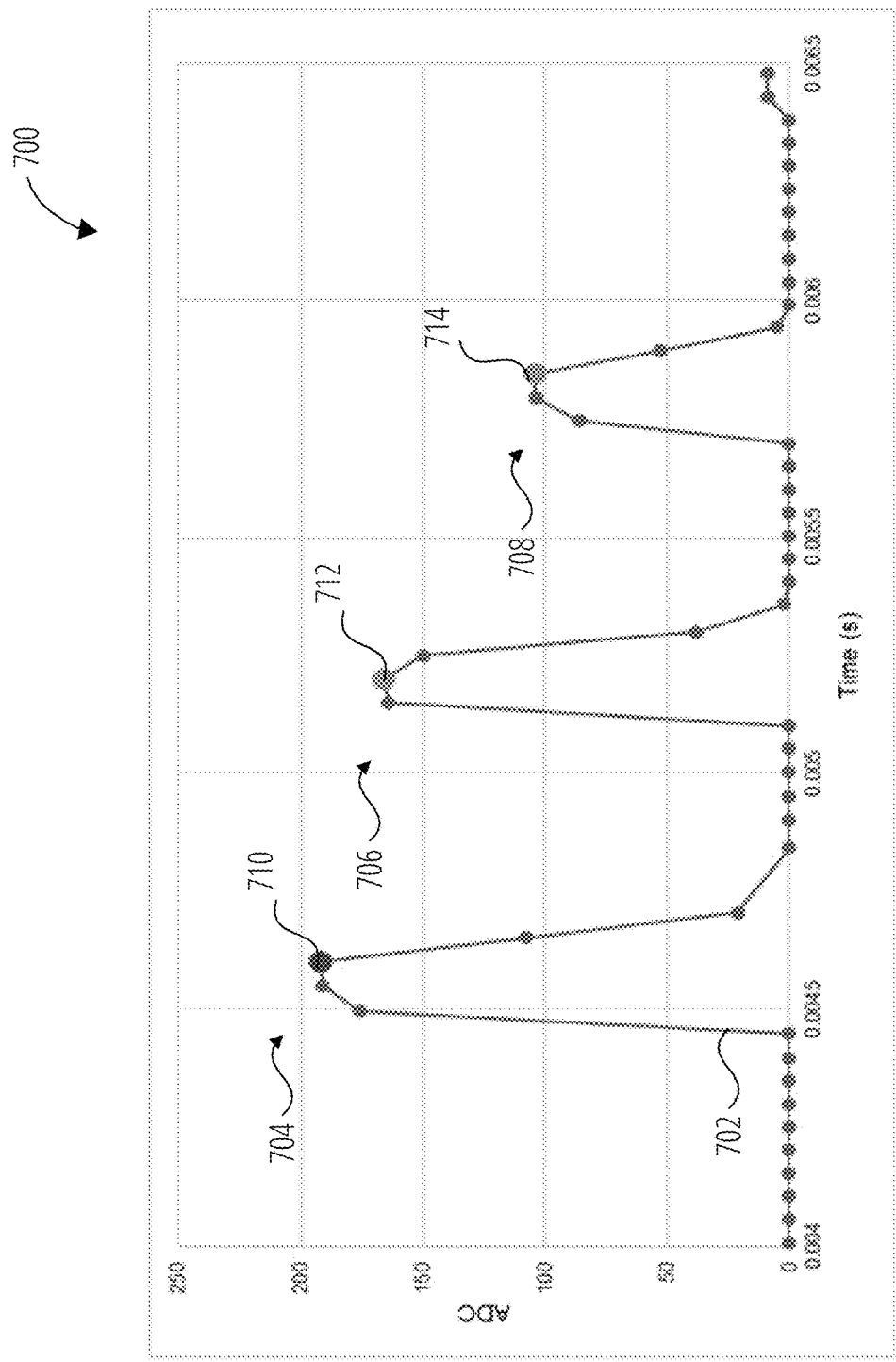
FIG. 7 is a graph showing raw Antennas as Sensors (A2S) signal, as measured by the analog-to-digital converter (ADC), from three sequential transmissions of a BLE advertisement packet over one of three Bluetooth channels according to at least one embodiment.

FIG. 7 is a graph 700 showing raw A2S signal 702, as measured by the ADC, from three sequential transmissions of a BLE advertisement packet over one of three Bluetooth channels according to at least one embodiment. That is, the signal measured from only one of the three channels is shown in FIG. 7. In particular, a wireless device can send a first transmission of the BLE advertisement packet in a first channel, resulting in a first pulse 704 in the A2S signal 702. The wireless device can send a second transmission of the BLE advertisement packet in a second channel, resulting in a second pulse 706 in the A2S signal 702. The wireless device can send a third transmission of the BLE advertisement packet in a third channel. The sequential transmissions results in a sequential pattern of pulses in the A2S signal 702, as measured by the ADC. The detection logic 104 can identify the sequential pattern and extract a peak value of each pulse. In particular, the detection logic 104 can extract a first peak value 710 from the first pulse, a second peak value 712 from the second pulse 706, and a third peak value 714 from the third pulse 708. Extracting the peak values of each pulse leads to a three-channel, quasi-continuous waveform representing A2S signal 702 over time, as shown in FIG. 8.

Figure 8:
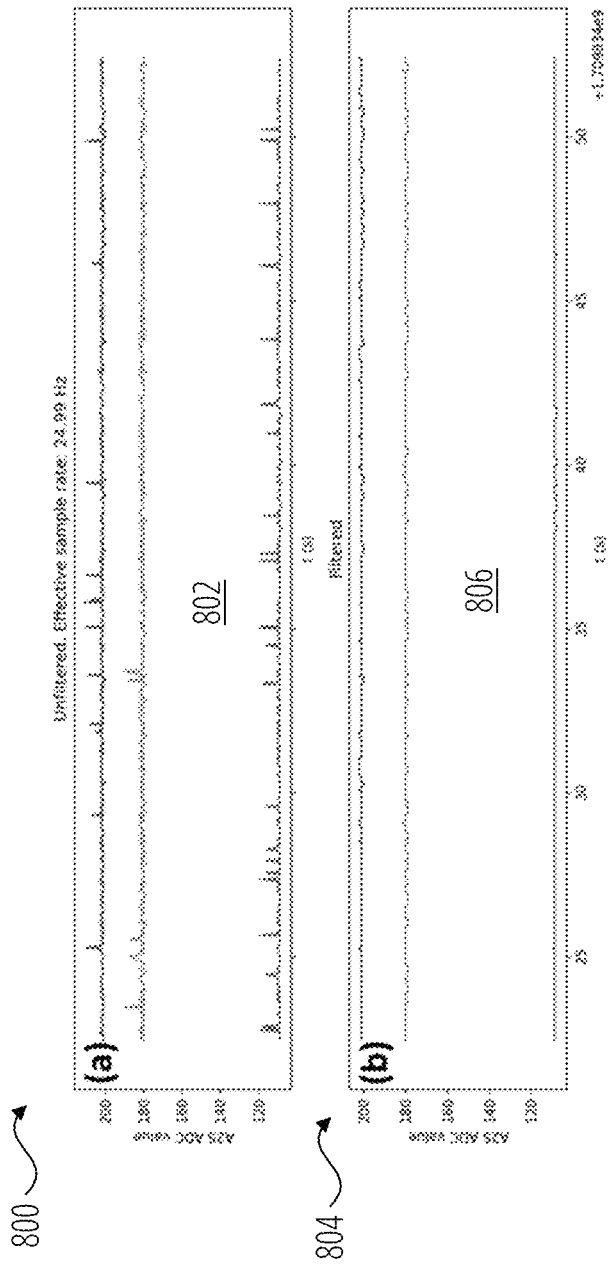
FIG. 8 illustrates a first graph of an unfiltered three-channel A2S signal and a second graph of a filtered three-channel A2S signal according to at least one embodiment.

FIG. 8 illustrates a first graph 800 of an unfiltered three-channel A2S signal 802 and a second graph 804 of a filtered three-channel A2S signal 806 according to at least one embodiment. As described above, the detection logic 104 can extract peak values from the three BLE advertisement packets to obtain the unfiltered three-channel A2S signal 802, as shown graph 800.

BLE advertisement can occur in parallel with normal wireless local area network (WLAN) operations, which includes numerous other transmissions at varying output power. Some of these transmissions overlap with the BLE advertisement peaks, leading to positive-polarity spikes visible in graph 800. To eliminate these spikes, the detection logic 104 can apply a rolling minimum filter to each channel of the unfiltered three-channel A2S signal 802 to get a smooth A2S baseline which is only modulated by antenna impedance changes caused by a nearby hand or object, as illustrated in the filtered three-channel A2S signal 806 of graph 804 (labeled (b)). That is, after extracting the peak values, the detection logic 104 can apply the rolling-minimum filter to obtain the filtered three-channel A2S signal 806.

It should be noted that, in this specific embodiment, the peak values are extracted from BLE advertisements for A2S signal processing. However, other embodiments may include ADC reads synchronized to BLE transmit pulses (e.g., interrupt triggering) that obviate pattern detection to extract the advertisement pulses from other transmissions, more sophisticated detection circuitry that can extract consistent A2S signal from any transmission (Wi-Fi vs. BLE and different transmit powers), or other techniques.

As illustrated in the graphs of FIG. 8, each channel of the three-channel A2S signal may fluctuate either positively or negatively depending on the excitation (e.g., location or angle of approach of the moving hand). A such, the detection logic 104 can further baseline-subtract and compute vector magnitude of the A2S signal to arrive at an input signal for a neural network. A sample plot of a fully preprocessed A2S signal is shown in FIG. 9.

Figure 9:
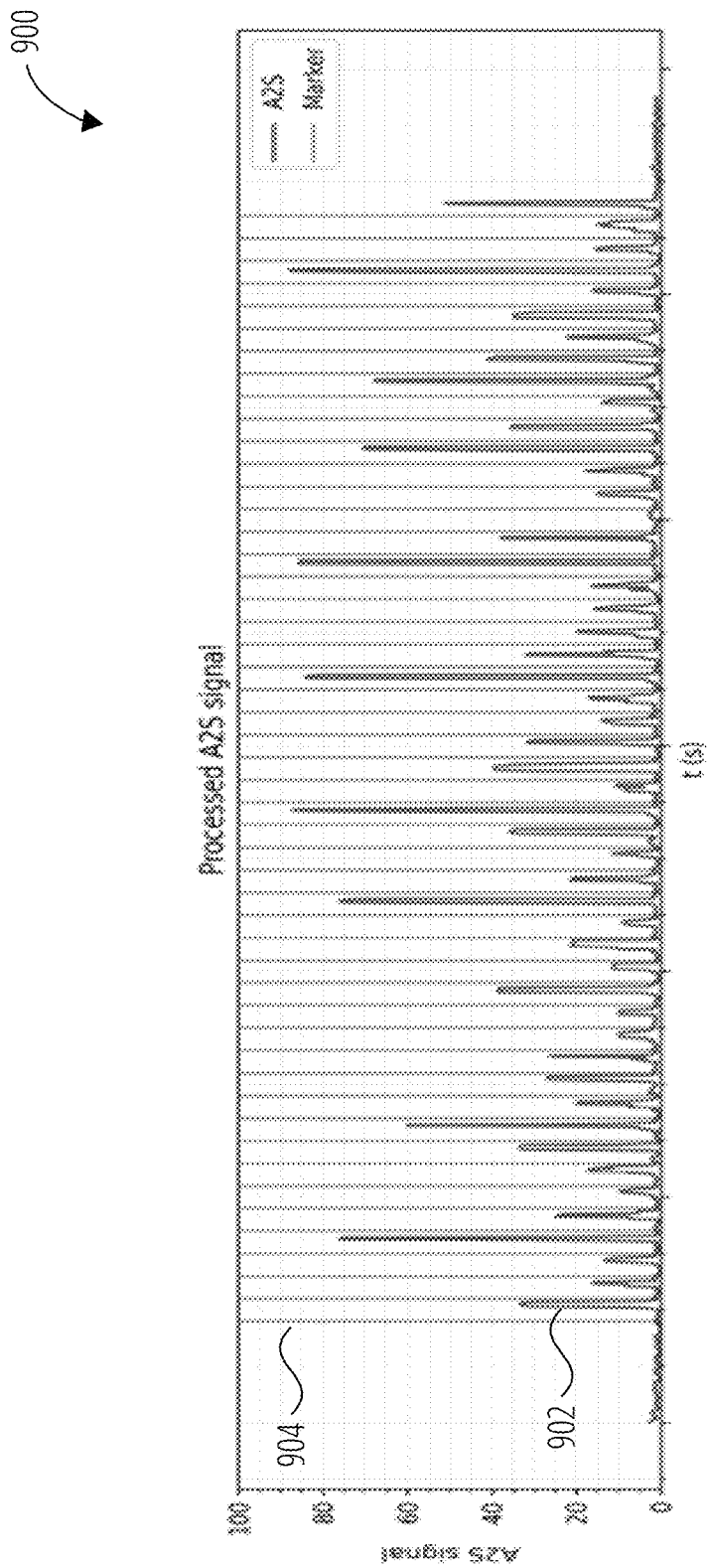
FIG. 9 is a graph showing a preprocessed A2S signal according to at least one embodiment.

FIG. 9 is a graph 900 showing a preprocessed A2S signal 902 according to at least one embodiment. As described above, the detection logic 104 can compute vector magnitudes of vector magnitude of baseline-subtracted, three-channel A2S signal to arrive at the preprocessed A2S signal 902 an input signal for a neural network. Graph 900 also shows vertical lines as markers 904 to delineates individual taps made at various locations over a top hemisphere of a wireless device.

Detection Logic

Figure 10:
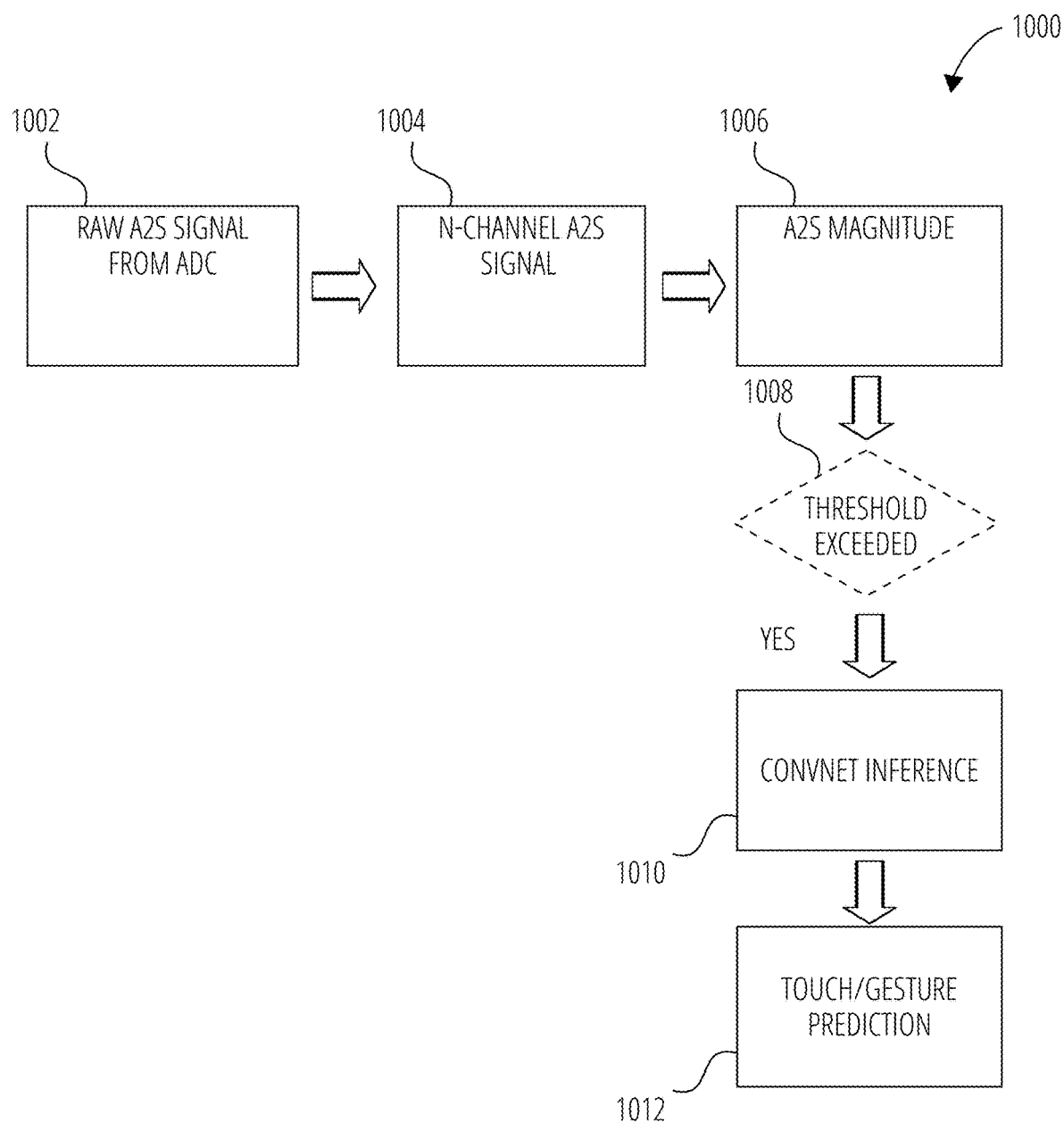
FIG. 10 is a flow diagram of high-level algorithm logic of tap classification logic according to at least one embodiment.

FIG. 10 is a flow diagram of high-level algorithm logic 1000 of detection logic 104 according to at least one embodiment. As described above, the raw A2S signals can be preprocessed into a processed A2S signal (e.g., 25 Hz amplitudes representing A2S excitations). The detection logic 104 receives impedance data (A2S signal) from an A2S system of the wireless device (block 1002). The impedance data is digital data representing impedance changes of an antenna captured by the A2S system. For example, the impedance data can be the raw A2S signals received from the ADC as described above. The detection logic 104 can preprocess the impedance data to obtain a waveform of magnitudes at a sampling rate. In at least one embodiment, the detection logic 104 can preprocess the raw A2S signals by generating an N-channel A2S signal, where N is a positive integer equal to or greater than one (block 1004), and extracting peak values as a waveform of A2S magnitudes (block 1006). For example, the N-channel A2S signal can be a three-channel, quasi-continuous waveform and have three pulses caused by three advertisement packets sent in three frequency channels. As described above, the detection logic 104 can apply a rolling minimum filter to each channel of the unfiltered N-channel A2S signal to get a smooth A2S baseline which is only modulated by antenna impedance changes caused by a nearby hand or object, as illustrated and described above with respect to FIG. 8.

In at least one embodiment, once the waveform of A2S magnitudes (i.e., preprocessed impedance data) is obtained at block 1006, the detection logic 104 can determine, using the impedance data and a machine learning (ML) model, a user input event representing a physical interaction event with the wireless device (block 1010). The user input event can be a tap prediction. The detection logic 104 can output the tap prediction (block 1012) and perform an action in response to the user input event (i.e., the tap prediction). In at least one embodiment, at block 1010, the ML model is a convolutional neural network that performs an inference.

In at least one embodiment, before inputting the waveforms into the ML model, some thresholding logic can be applied at block 1008, such as illustrated in FIG. 10. For example, the preprocessed signals (e.g., 25 Hz amplitudes/magnitudes representing A2S excitations) can be continuously monitored with a threshold detection logic at block 1008. When the A2S signal exceeds a pre-set threshold within a certain time window, a region-of-interest (ROI) is determined and further analyzed via the convolutional neural network (or other ML model). In at least one embodiment, the detection logic 104 determines whether the waveform exceeds a threshold within a certain time window. The detection logic 104 can determine a ROI in the waveform for inputs to the ML model, responsive to the waveform exceeding the threshold within the certain time window.

In at least one embodiment, a convolutional neural network can be trained to predict whether a given segment (also referred to herein as "time window") of A2S corresponds to a tap or a non-tap. For example, each input segment can include 18 samples of 25-Hz A2S data (i.e., an 18×2 tensor), where the candidate segment is extracted from continuous A2S data based on amplitude criteria for the signal. For training, data can be collected containing both positive results (intentional taps) and negative results (non-taps). To generate negative training data, actions that induce signals can be performed so as to exceed the amplitude threshold and trigger neural network inference. For example, the actions can include hovering hands nearby the wireless device. It should be noted that specific parameters, such as the number of A2S signal channels and length of input segments may vary from product to product.

Figure 11A:
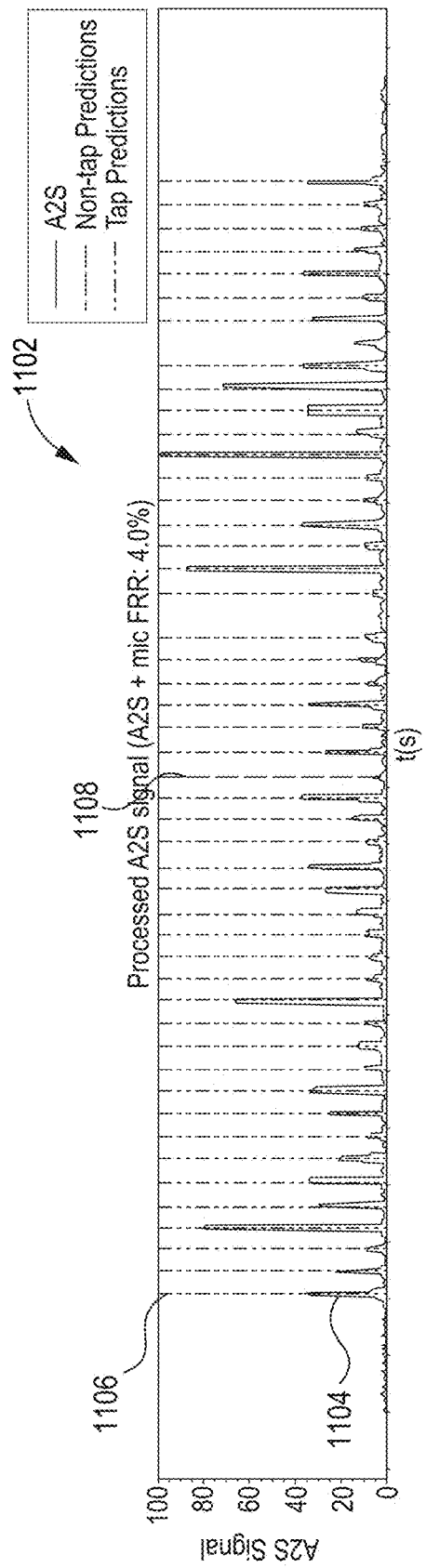
FIG. 11A is a graph illustrating a preprocessed A2S signal for fifty taps, according to at least one embodiment.
Figure 11B:
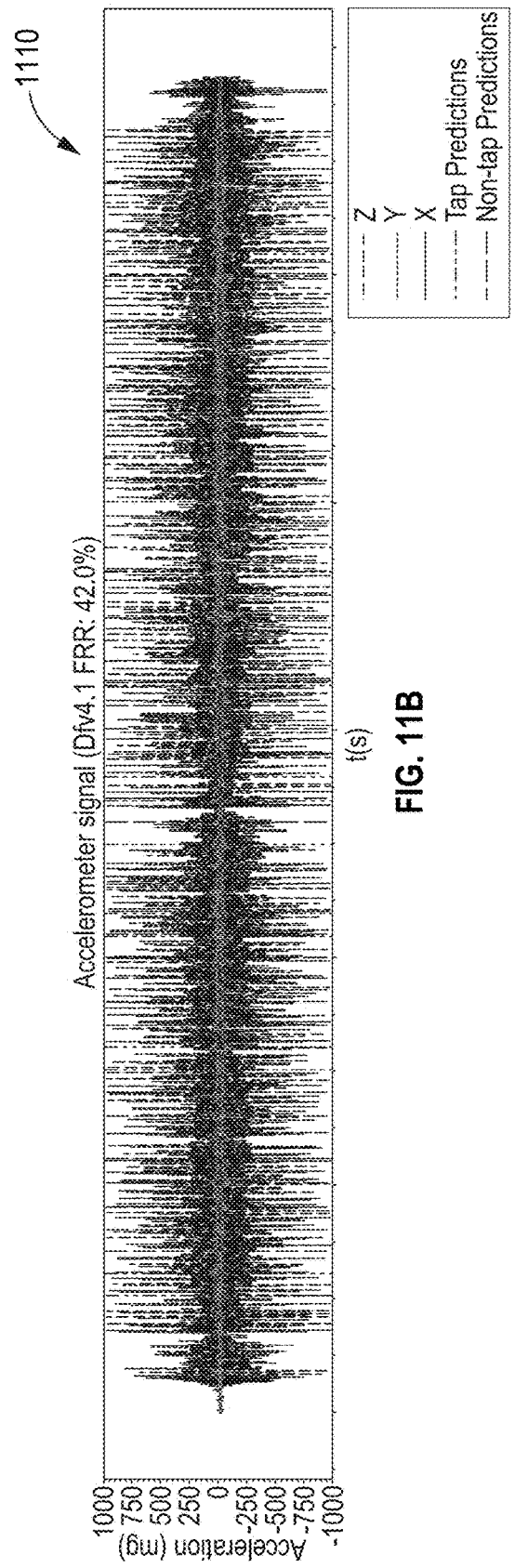
FIG. 11B is a graph illustrating a raw accelerometer signal along with tap and non-tap predictions for the accelerometer algorithm according to at least one implementation.

Embodiments of the ML model (also referred to as tap detection model) based on A2S data can improve sensitivity as compared to tap detection models based on accelerometer, as illustrated in graphs of FIG. 11A and FIG. 11B. In particular, the tap detection models based on A2S data is robust to situations that challenge the accelerometer approach, such as placing the wireless device on wobbly furniture or tapping in the presence of loud music. For the data in graphs of FIG. 11A-FIG. 11B, a user tapped fifty times on a wireless device while playing music at maximum volume.

FIG. 11A is a graph 1102 illustrating a preprocessed A2S signal 1104 for fifty taps, according to at least one embodiment. The vertical lines indicate either tap predictions 1106 or non-tap predictions 1108 from the A2S algorithm of the detection logic 104.

FIG. 11B is a graph 1110 illustrating a raw accelerometer signal along with tap and non-tap predictions for the accelerometer algorithm according to at least one implementation. A comparison of graphs 1102 of FIG. 11A against the graph 1110 of FIG. 11B, highlights the improvement in tap visibility using A2S data with the signal processing techniques described herein as compared to the approaches using accelerometer data. Additionally, an end-to-end ML model (e.g., convolution neural network) can correctly predict taps at a much higher rate using A2S data as compared to accelerometer data. At the same time, the end-to-end ML model can correctly reject false taps despite hovering/waving hands near the surface of the wireless device in the presence of max-volume music playback.

Figure 12:
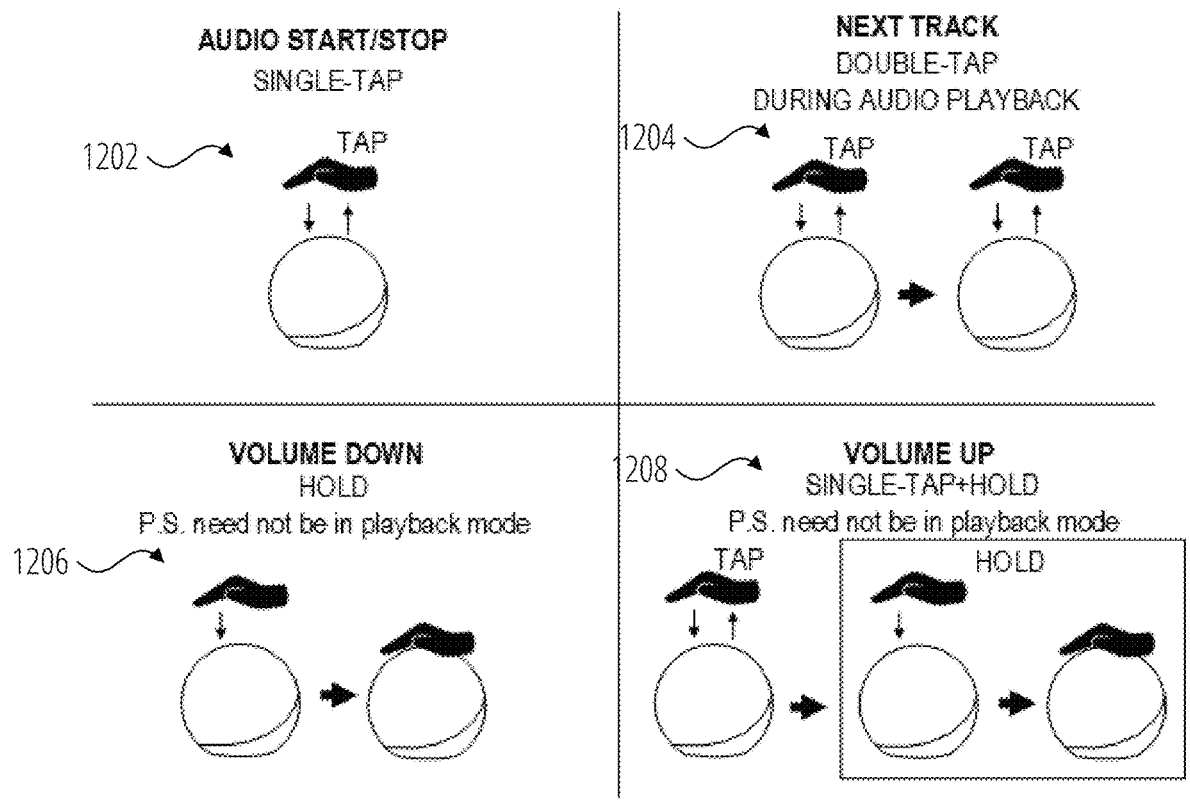
FIG. 12 illustrates multiple gestures and corresponding actions according to at least one embodiment.

FIG. 12 illustrates multiple gestures and corresponding actions according to at least one embodiment. A single tap gesture 1202 involves a user momentarily placing their hand over a wireless device and removing their hand within a specified amount of time. As a result of detecting the single tap gesture 1202, the wireless device can start or stop audio playback during an audio playback mode. A double-tap gesture 1204 involves the user momentarily placing their hand over a wireless device, removing their hand within a specified amount of time, momentarily placing their hand over the wireless device again within a specified amount of time, and removing their hand within a specified amount of time. As a result of detecting the double-tap gesture 1204, the wireless device can skip to a next track during an audio playback mode. A hold gesture 1206 involves a user placing their hand over a wireless device and keeping their hand there for a specified amount of time. As a result of detecting the hold gesture 1206, the wireless device can decrease the volume. The volume can be decreased in the playback mode or in other modes. A tap and hold gesture 1208 involves a user momentarily placing their hand over a wireless device and removing their hand within a specified amount of time, placing their hand again over the wireless device and keeping their hand there for a specified amount of time. As a result of detecting the tap and hold gesture 1208, the wireless device can increase the volume. The volume can be increased in the playback mode or in other modes.

As described above, the detection logic 104 can detect simple single-touch gestures, such as a touch, tap, or double tap of the wireless device, as illustrated in FIG. 12. Normally multiple antennas and detection circuits would be needed to detect touches in multiple locations of the wireless device. However, as described herein, the detection logic 104 can also recognize multiple touches at different locations over time for additional touch events or gesture events, including swipe gestures, using the antenna 110.

Figure 13:
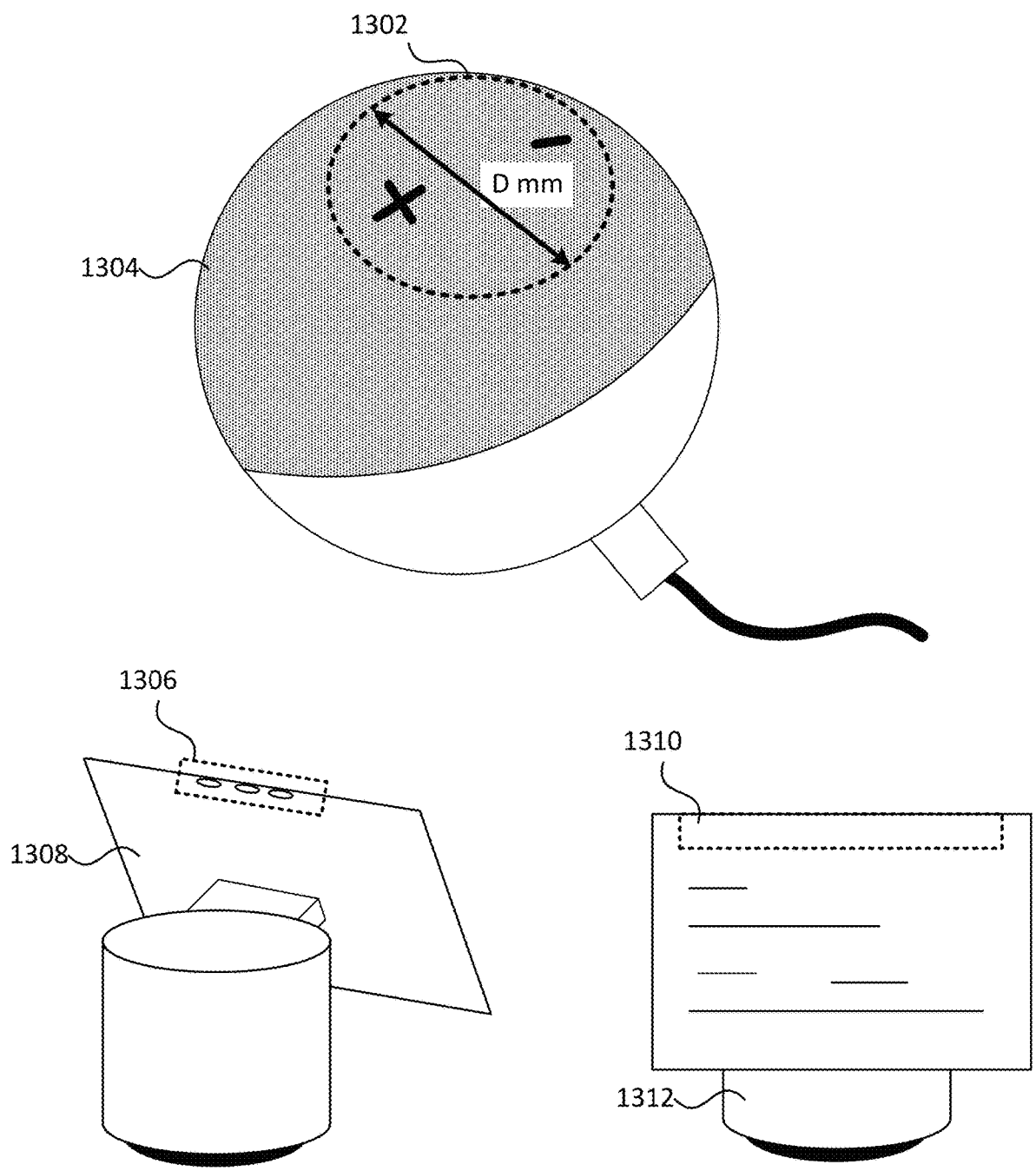
FIG. 13 show a few examples of ergonomically suitable areas for placement of an antenna according to various embodiment.

FIG. 13 show a few examples of ergonomically suitable areas for placement of an antenna according to various embodiment. In at least one embodiment, the antenna can be located right under an inner layer of an external housing in a first area 1302 of a first wireless device 1304. The first area 1302 can be located at a top of a dome of the first wireless device 1304. The antenna can replace one or more capacitive or mechanical push buttons that would otherwise be located in the first area 1302.

In at least one embodiment, the antenna can be located right under an inner layer of an external housing in a second area 1306 of a second wireless device 1308. The second area 1306 can be located in a top edge of a display of the second wireless device 1308. The antenna can replace one or more capacitive or mechanical push buttons that would otherwise be located in the second area 1306.

In at least one embodiment, the antenna can be located behind a glass at a top portion in a third area 1310 of a third wireless device 1312. Alternatively, the antenna can be located behind a glass on a side portion of the screen (not labeled in FIG. 13). The third area 1310 can be located in the top outer rim of the display to enable smooth touch/swipe gestures as if part of the display.

It should be noted that the conceptualization of an antenna can start with considering certain design requirements, such as the following:
1. how many unique gesture detection is required? and in turn how many virtual touch buttons are required (N) to achieve those gestures?
2. What is the preferred layout of the virtual buttons on the device surface that will give best customer experience while performing different gestures? This will in turn define the required physical extent of the antenna aperture, which is also primarily depends on the operating frequency. The higher the frequency the smaller the antenna footprint.
3. Considering average human fingertip size varying in the range ~10-15 mm diameter, any two neighboring virtual buttons should have adequate physical separation from each other to minimize overlap of their touch sensitive regions.

For example, the first area 1302 of the first wireless device 1304 can have a specified diameter of D (e.g., 50 mm) where normally four capacitive push buttons are located in a diamond shape, namely Mute, Volume Up, Action, Volume Down. The antenna can be located in this same area and have three or four virtual buttons defined. The housing can have labels that identify where the user should touch for the respective action items.

In at least one embodiment, an electronic device includes a wireless communication component, an RF switch, an A2S system, one or more processors, and one or more computer readable media. The wireless communication component is coupled to the antenna via a radio frequency (RF) path. The RF switch coupled to the RF path and the A2S system is coupled to the RF switch. The one or more processors are coupled to the wireless communication component and the A2S system. The one or more computer readable media store processor executable instructions which, when executed using the one or more processors, cause the electronic device to perform operations comprising: sending RF signals to the antenna via the RF path in a first time window; controlling the RF switch to selectively couple the A2S system to the RF path in the first time window; receiving an analog voltage signal representing impedance changes of the antenna in the first time window; determining, using the analog voltage signal, a user input event caused by a presence of an object in proximity to the antenna; and performing an action in response to the user input event.

In a further embodiment, the one or more computer readable media store processor executable instructions which, when executed using the one or more processors, cause the electronic device to perform operations further including: preprocessing the impedance data to obtain a first waveform of magnitudes at a first sampling rate; determining whether the first waveform exceeds a first threshold within a certain time window; and determining a region of interest (ROI) in the first waveform for inputs to the ML model, responsive to the first waveform exceeding the first threshold within the certain time window. In at least one embodiment, the first sampling rate is approximately 25 Hz. Alternatively, other sampling rates may be used.

In at least one embodiment, the electronic device includes an analog-to-digital converter coupled to the A2S system. In at least one embodiment, the ADC can receive an analog voltage signal from the detection circuit and sample the analog voltage signal at a first sampling rate to obtain the impedance data representing the impedance changes of the antenna. The operation of determining of the first voltage value and the determining of the second voltage value utilizes the analog-to-digital converter. In at least one embodiment, the first voltage value is a value that was sampled using the analog-to-digital converter from a signal received from the detection circuit.

In at least one embodiment, the operations further include: identifying a sequential pattern of pulses and extracting a peak value of each pulse, the sequential pattern of pulses corresponding to a plurality of advertisement packets over the antenna over a plurality of frequency channels during a first time window; and generating, using the peak values, a multi-channel waveform representing the impedance changes of the antenna in the plurality of frequency channels during the first time window, wherein the multi-channel waveform is the first waveform input into the ML model.

In at least one embodiment, the operations further include: transmitting a plurality of advertisement packets over the antenna over a plurality of frequency channels during a first time window; measuring and converting, by a detection circuit of the A2S system, the impedance changes of the antenna into an analog voltage signal; and converting the analog voltage signal, by an analog-to-digital converter (ADC) of the A2S, into the impedance data corresponding to the first time window.

In at least one embodiment, the ML model is a convolutional neural network. In at least one embodiment, the determining the user input event includes predicting, using the convolution neural network, whether a segment of the impedance data corresponds to the user input event representing the physical interaction event with the device.

In at least one embodiment, the user input event is at least one of a tap event, a single-touch event corresponding to a user touch of the device, a multi-touch event corresponding to multiple simultaneous user touches of the device, a swipe event involving a user touch or user touches of the device, or a gesture event involving a user touch or user touches of the device.

Figure 14:
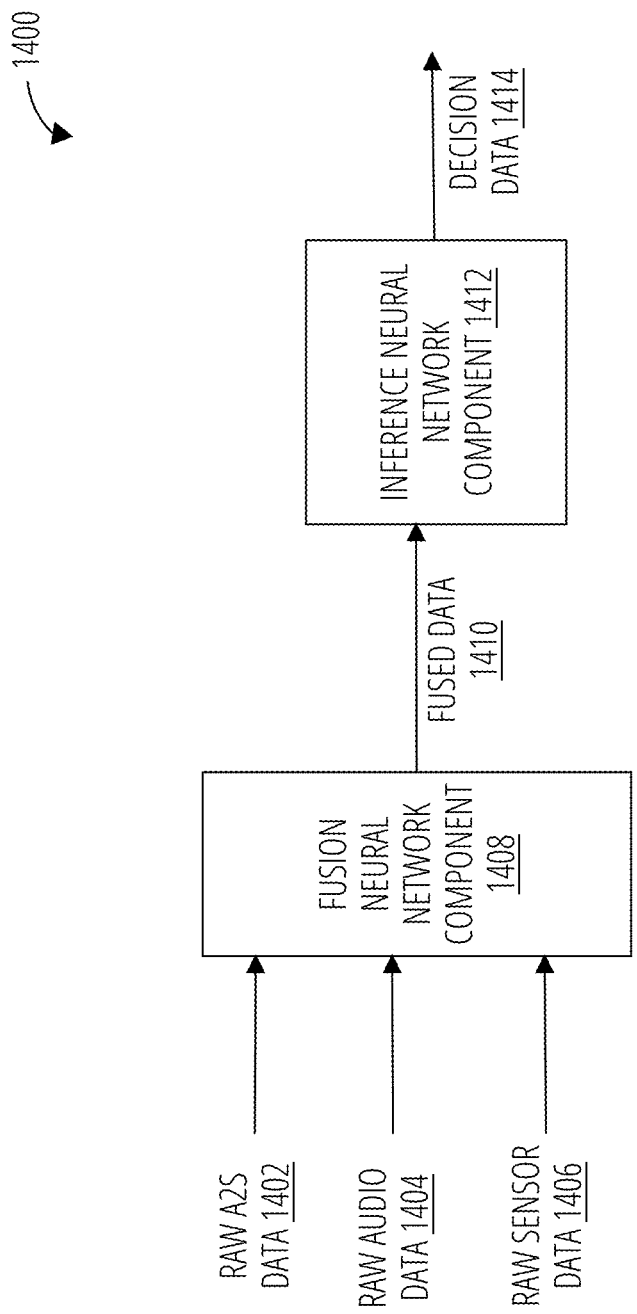
FIG. 14 illustrates an example component diagrams for an event detection pipeline according to at least one embodiment.

FIG. 14 illustrates an example of an event detection pipeline 1400 configured to perform event detection. In the event detection pipeline 1400, the inference neural network component 1412 may perform event detection by processing fused data 1410 to generate decision data 1414. As illustrated in FIG. 14, the feature extraction components are not included in the event detection pipeline 1400. Instead, a fusion neural network component 1408 may receive the raw A2S data 1402 and other sensor data, such as raw audio data 1404 or raw sensor data 1406 from other sensor inputs prior to feature extraction, as illustrated in FIG. 14. While the raw A2S data 1402 is illustrated as a single input, the disclosure is not limited thereto and the fusion neural network component 1408 may receive separate raw A2S data 1402 from two or more sensor components of the wireless device 100 without departing from the disclosure.

In some examples, the fusion neural network component 1408 may receive the raw A2S data 1402 and the raw audio data 1404, and may generate fused data 1410 using only these two inputs. In other examples, the fusion neural network component 1408 may receive the raw A2S data 1402, the raw audio data 1404, and the raw sensor data 1406 associated with one or more sensors and may generate the fused data 1410 using these inputs. However, the disclosure is not limited thereto and the fusion neural network component 1408 may generate the fused data 1410 based on the raw A2S data 1402, the raw audio data 1404, the raw sensor data 1406, and/or a combination thereof without departing from the disclosure. For example, the fusion neural network component 1408 may generate the fused data 1410 using the raw audio data 1404 and the raw A2S data 1402, but not the raw sensor data 1406, without departing from the disclosure. Additionally or alternatively, the fusion neural network component 1408 may receive features extracted from any of the raw A2S data 1402, the raw audio data 1404, and/or the raw sensor data 1406 without departing from the disclosure.

While the fusion neural network component 1408 may be configured to process a number of different inputs, the fusion neural network component 1408 may include a separate neural network branch for each unique input (e.g., discrete branch per modality). Thus, the fusion neural network component 1408 may include distinct branches configured to extract features from different sensing modalities. For example, the fusion neural network component 1408 may include sensing-modality-specific feature extraction layers, enabling the fusion neural network component 1408 to extract features independently for each input before generating the fused data 1410.

Depending on the inputs, a number of branches, a branch depth, and/or a number of event detectors may vary without departing from the disclosure. For example, two input branches can uniform depths, two input branches different branch depths, three or more branches with uniform or different branch depths, or varying a number of event detectors (e.g., performing task-specific processing using the shared fused data 1410).

In some examples the wireless device 100 may associate a first number of samples of the input data (e.g., 200 samples) with each individual ROI on which to perform event detection. For example, the wireless device 100 may continuously buffer the raw A2S samples and audio features (e.g., average Root Mean Square (RMS) values R[i] and interaural level difference (ILD) values ILD[i]), such that the ROI on which to perform event detection may consist of 200 values for each of the features (e.g., A2S[i], R[i], and ILD[i] for i∈{1, ..., 200}). Thus, the raw A2S data 1402 may correspond to three channels of the first number of samples, such that A2S channels have first dimensions (e.g., 1×200×3 input), while the audio feature data (based on raw audio data 1404) may correspond to two channels of the first number of samples, such that audio channels have second dimensions (e.g., 1×200×2 input).

Figure 15:
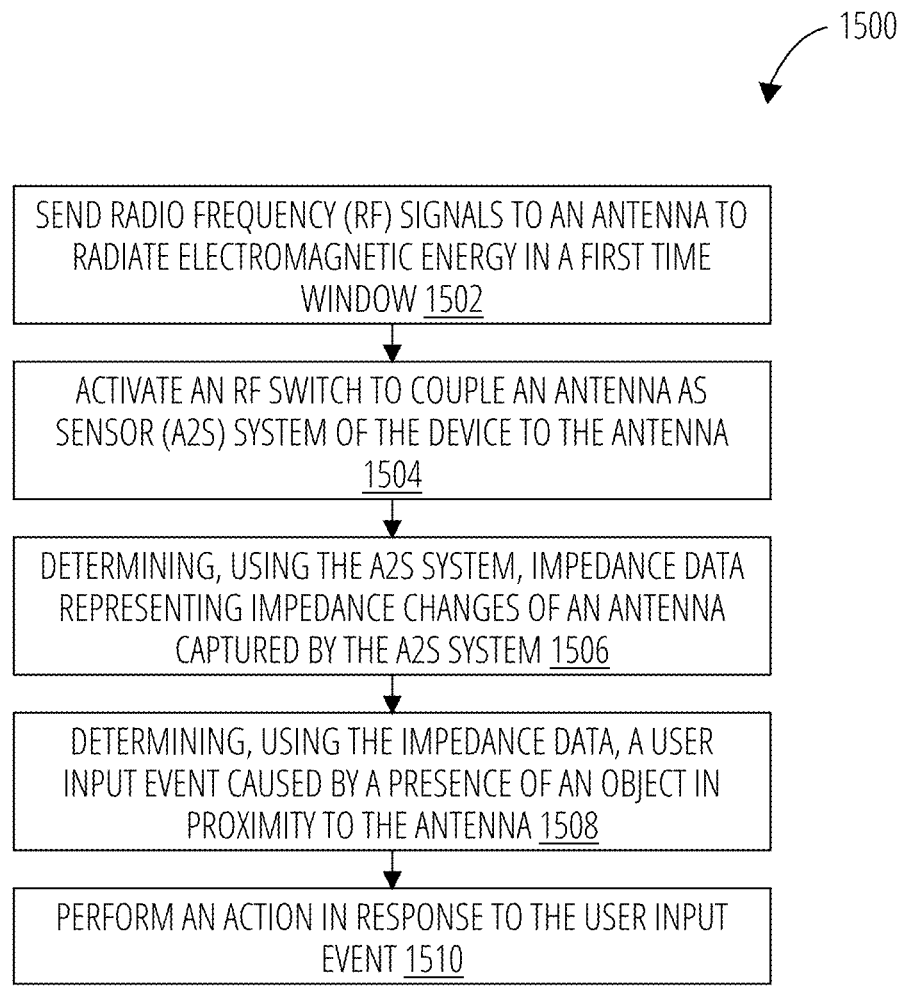
FIG. 15 illustrates a method of detecting a user input event according to at least one embodiment.

FIG. 15 is a flow chart of a method 1500 of detecting a user input event according to at least one embodiment. The method 1500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 1500 is performed by the wireless device 100 of FIG. 1A. In one embodiment, the method 1500 is performed by the first wireless device 1304, second wireless device 1308, or third wireless device 1312 of FIG. 13. The method 1500 can be performed by other devices described herein.

Referring to FIG. 15, the method 1500 begins with the processing logic sending radio frequency (RF) signals to an antenna to radiate electromagnetic energy in a first time window (block 1502). At block 1504, processing logic activates an RF switch to couple an A2S system of the device to the antenna. At block 1506, the processing logic determines, using the A2S system, impedance data representing impedance changes of an antenna captured by the A2S system. At block 1508, the processing logic determines, using the impedance data, a user input event caused by a presence of an object in proximity to the antenna. At block 1510, the processing logic performs an action in response to the user input event.

In a further embodiment, the processing logic transmits a plurality of advertisement packets over the antenna over a plurality of frequency channels during the first time window. The processing logic measures and converts, using a detection circuit of the A2S system, the impedance changes of the antenna into an analog voltage signa. The processing logic converts the analog voltage signal, by an analog-to-digital converter (ADC) of the A2S system, into the impedance data corresponding to the first time window.

In at least one embodiment, the processing logic preprocesses the impedance data to obtain a first waveform of magnitudes at a first sampling rate. The processing logic determines whether the first waveform exceeds a first threshold within a certain time window. The processing logic determines a region of interest (ROI) in the first waveform for inputs to the ML model, responsive to the first waveform exceeding the first threshold within the certain time window.

In at least one embodiment, the processing logic, to preprocess the impedance data, identifies a sequential pattern of pulses and extracting a peak value of each pulse, the sequential pattern of pulses corresponding to a plurality of advertisement packets over the antenna over a plurality of frequency channels during a first time window. The processing logic generates, using the peak values, a multi-channel waveform representing the impedance changes of the antenna in the plurality of frequency channels during the first time window, where the multi-channel waveform is the first waveform.

In at least one embodiment, the processing logic transmits a plurality of advertisement packets over the antenna over a plurality of frequency channels during a first time window. The processing logic measures and converts, using a detection circuit of the A2S system, the impedance changes of the antenna into an analog voltage signal. The processing logic converts the analog voltage signal, by an analog-to-digital converter (ADC) of the A2S, into the impedance data corresponding to the first time window.

In at least one embodiment, the ML model is a convolutional neural network. The processing logic determines the user input event by predicting, using the convolution neural network, whether a segment of the impedance data corresponds to the user input event representing the physical interaction event with the device.

In at least one embodiment, the user input event is at least one of a tap event, a single-touch event corresponding to a user touch of the device, a multi-touch event corresponding to multiple simultaneous user touches of the device, or a gesture event involving a user touch or user touches of the device.

Figure 16:
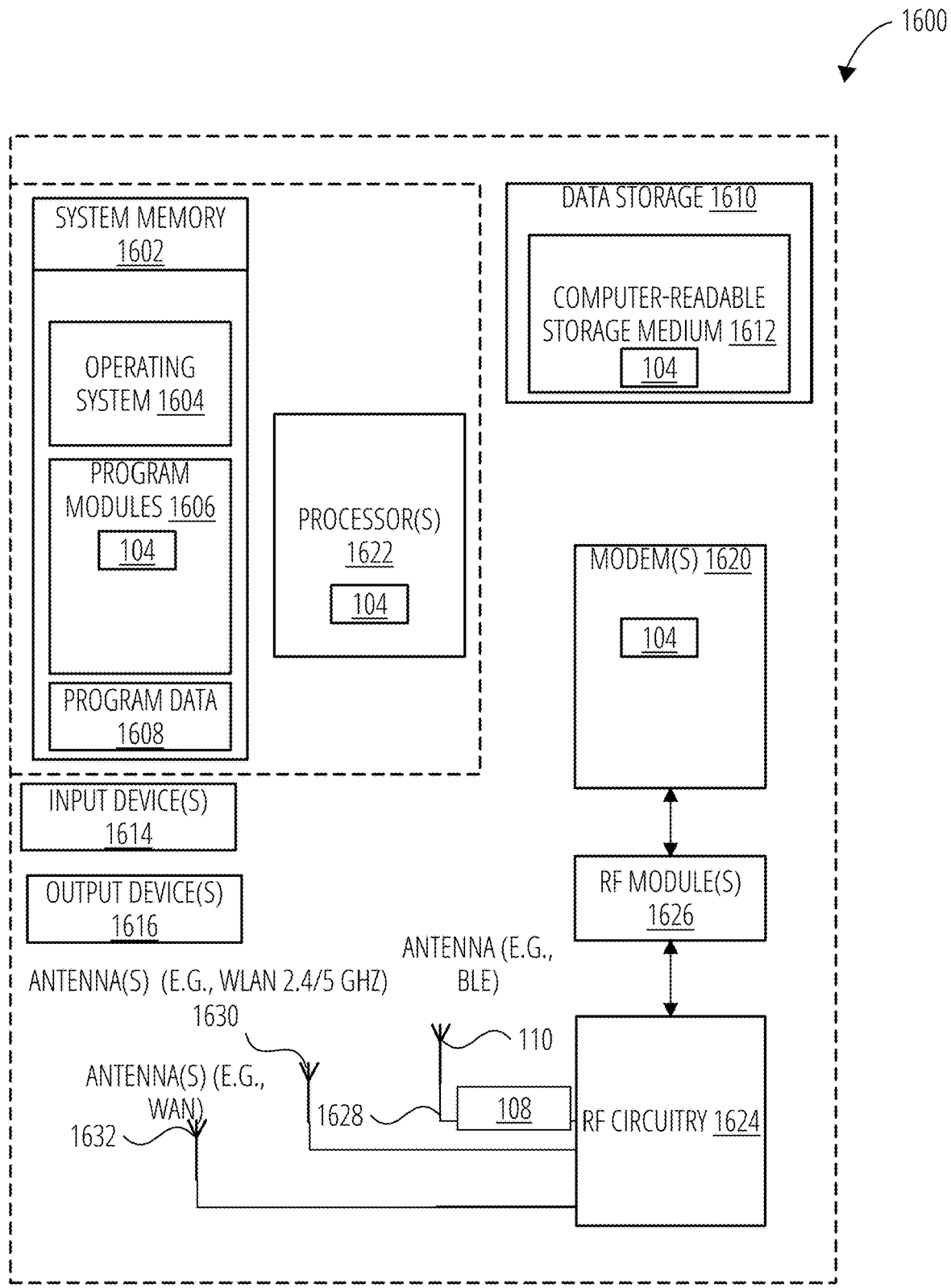
FIG. 16 is a block diagram of a wireless device with detection logic and a detection circuit according to one embodiment.

FIG. 16 is a block diagram of a wireless device 1600 with detection logic 104 and a detection circuit 108 according to one embodiment. The wireless device 1600 may correspond to any devices described above with respect to FIG. 1A to FIG. 15. In the depicted embodiment, the wireless device 1600 includes the detection logic 104 and detection circuit 108. Alternatively, the wireless device 1600 may be other electronic devices, as described herein. In at least one embodiment, the wireless device 1600 may correspond to multiple different designs without departing from the disclosure. For example, the wireless device 1600 can be a first speech-detection device having a first microphone array (e.g., six microphones), a second speech-detection device having a second microphone array (e.g., two microphones), a display device, a tablet computer, a smart watch, a smart phone, or other electronic devices. Each of these devices may apply the tap detection algorithm described above to perform tap detection and detect a physical interaction with the device without departing from the disclosure. Additionally or alternatively, multiple devices may contain components of the system, and the devices may be connected over a network. The network(s) may include a local or private network or may include a wide network such as the Internet. Devices may be connected to the network(s) through either wired or wireless connections without departing from the disclosure. For example, some of the devices may be connected to the network(s) through a wireless service provider, over a WLAN (e.g., Wi-Fi) or cellular network connection, and/or the like, although the disclosure is not limited thereto.

The wireless device 1600 includes one or more processor(s) 1622, such as one or more central processing units (CPUs), microcontrollers, field-programmable gate arrays, or other types of processors. The wireless device 1600 also includes system memory 1602, which may correspond to any combination of volatile and/or non-volatile storage mechanisms. The system memory 1602 stores information that provides operating system component 1604, various program modules 1606, program data 1608, and/or other components. In one embodiment, the system memory 1602 stores instructions of methods to control the operation of the wireless device 1600. The wireless device 1600 performs functions by using the processor(s) 1622 to execute instructions provided by the system memory 1602. In one embodiment, the program modules 1606 may include the detection logic 104 described herein. The detection logic 104 may perform some of the operations for detection gestures, touch events, hover events, or the like, as described herein.

The wireless device 1600 also includes a data storage device 1610 that may be composed of one or more types of removable storage and/or one or more types of non-removable storage. The data storage device 1610 includes a computer-readable storage medium 1612 on which is stored one or more sets of instructions embodying any of the methodologies or functions described herein. Instructions for the program modules 1606 (e.g., detection logic 104) may reside, completely or at least partially, within the computer-readable storage medium 1612, system memory 1602, and/or within the processor(s) 1622 during execution thereof by the wireless device 1600, the system memory 1602 and the processor(s) 1622 also constituting computer-readable media. The wireless device 1600 may also include one or more input device(s) 1614 (keyboard, mouse device, specialized selection keys, etc.) and one or more 1616 (displays, printers, audio output mechanisms, etc.).

The wireless device 1600 further includes one or more modem(s) 1620 to allow the wireless device 1600 to communicate via wireless connections (e.g., such as provided by the wireless communication system) with other computing devices, such as remote computers, an item providing system, and so forth. The modem(s) 1620 can be connected to one or more radio frequency (RF) modules 1626. The RF modules 1626 may be a WLAN module, a WAN module, a wireless personal area network (WPAN) module, a Global Positioning system (GPS) module, or the like. The antenna 110, and other antenna(s) 1630 and 1632 are coupled to the RF circuitry 1624, which is coupled to the modem(s) 1620. The antenna 110 is coupled to the detection circuit 108. The RF circuitry 1624 may include radio front-end circuitry, antenna switching circuitry, impedance matching circuitry, or the like. The antenna 110 can be a wireless personal area network (WPAN) antenna (e.g., BLE). The antenna(s) 1630, 1632 may be near field communication (NFC) antennas, other WAN antennas, WLAN or PAN antennas, or the like. The modem(s) 1620 allows the wireless device 1600 to handle both voice and non-voice communications (such as communications for text messages, multimedia messages, media downloads, web browsing, etc.) with a wireless communication system. The modem(s) 1620 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem(s) 1620 may generate signals and send these signals to the antenna 110 of a first type (e.g., BLE), antenna(s) 1230 of a second type (e.g., WLAN 2.4 GHZ), and/or antenna(s) 1232 of a third type (e.g., WAN), via RF circuitry 2424, and RF module(s) 1626 as described herein. antenna 110 and antenna(s) 1630, 1632 may be configured to transmit in different frequency bands and/or using different wireless communication protocols. The antenna 110, antenna(s) 1630, 1632 may be directional, omnidirectional, or non-directional antennas. In addition to sending data, antenna 110, antenna(s) 1630, 1632 may also receive data, which is sent to appropriate RF modules connected to the antennas. The antenna 110 may be any combination of the antenna structures described herein.

In one embodiment, the wireless device 1600 establishes a first connection using a first wireless communication protocol, and a second connection using a different wireless communication protocol. The first wireless connection and second wireless connection may be active concurrently, for example, if a wireless device is receiving a media item from another wireless device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of a wireless mesh network and the second wireless connection may be associated with serving a content file to a client consumption device, as described herein.

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solidstate memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A wireless device comprising:
   an antenna;
   a radio coupled to the antenna, the radio to send radio frequency (RF) signals to the antenna to radiate electromagnetic energy to another wireless device in a first time window;
   a processing device coupled to the radio, the processing device comprising an analog-to-digital converter (ADC) and detection logic;
   an RF switch coupled to an RF path between the antenna and the radio, the RF switch being activated in the first time window;
   a detection circuit coupled to the RF switch, the detection circuit to output an analog voltage signal to the ADC of the processing device to generate an Antenna as Sensor (A2S) signal in the first time window, the A2S signal representing impedance changes of the antenna, wherein:
      the detection logic is to receive the A2S signal from the ADC;
      the detection logic is to determine, using the A2S signal, a user input event caused by a presence of an object in proximity to the antenna; and
      the processing device is to perform an action in response to the user input event.

2. The wireless device of claim 1, wherein the RF path is a transmit path coupled between the radio and the antenna, wherein the RF switch is coupled to receive a control signal from the radio, the control signal indicating the radio is sending the RF signals to the antenna in the first time window.

3. The wireless device of claim 1, wherein the RF path is a transmit path coupled between the radio and the antenna, wherein the RF switch is coupled to receive a control signal from the processing device, the control signal indicating the radio is sending the RF signals to the antenna in the first time window.

4. The wireless device of claim 1, wherein:
   the radio is to transmit a plurality of advertisement packets over the antenna over a plurality of frequency channels during the first time window; and
   the detection circuit is to measure and convert the impedance changes of the antenna into the analog voltage signal during the first time window.

5. An electronic device comprising:
   a wireless communication component coupled to an antenna via a radio frequency (RF) path;
   an RF switch coupled to the RF path;
   an Antenna as Sensor (A2S) system coupled to the RF switch;
   one or more processors coupled to the wireless communication component and the A2S system; and
   one or more computer readable media storing processor executable instructions which, when executed using the one or more processors, cause the electronic device to perform operations comprising:
      sending one or more RF signals to the antenna via the RF path in a first time window;
      controlling the RF switch to selectively couple the A2S system to the RF path in the first time window;
      receiving an analog voltage signal representing impedance changes of the antenna in the first time window; and
      determining, using the analog voltage signal, a user input event caused by a presence of an object in proximity to the antenna; and
   performing an action in response to the user input event.

6. The electronic device of claim 5, wherein the RF path is a transmit path over which the wireless communication component sends RF signals.

7. The electronic device of claim 5, wherein the RF path is a bi-directional path over which the wireless communication component sends and receives RF signals.

8. The electronic device of claim 5, wherein the one or more processors are part of a System on Chip (SoC) and an analog-to-digital converter (ADC), wherein the RF switch is to receive a control signal from the wireless communication component, the control signal indicating the wireless communication component is sending RF signals to the antenna in the first time window.

9. The electronic device of claim 5, wherein the one or more processors are part of a System on Chip (SoC) and an analog-to-digital converter (ADC), wherein the RF switch is to receive a control signal from the SoC, the control signal indicating the wireless communication component is sending RF signals to the antenna in the first time window.

10. The electronic device of claim 5, wherein the RF switch is to receive a first control signal from the wireless communication component and a second control signal from the one or more processors, the first control signal indicating the wireless communication component is sending RF signals to the antenna in the first time window and the second control signal enabling the A2S system.

11. The electronic device of claim 5, further comprising:
a transmit path;
a receive path; and
a second RF switch coupled to the transmit path, the receive path, and the antenna, wherein the RF switch is coupled to only the transmit path.

12. The electronic device of claim 5, further comprising:
a transmit path;
a receive path; and
a second RF switch coupled to the transmit path, the receive path, and the antenna, wherein the RF switch is coupled to the transmit path and the receive path.

13. The electronic device of claim 5, wherein the RF switch and the A2S system are integrated into the wireless communication component.

14. The electronic device of claim 13, wherein the wireless communication component comprises:
a transmit path;
a receive path; and
a second RF switch coupled to the transmit path, the receive path, and the antenna, wherein the RF switch is coupled to only the transmit path.

15. The electronic device of claim 13, wherein the wireless communication component comprises:
a transmit path;
a receive path; and
a second RF switch coupled to the transmit path, the receive path, and the antenna, wherein the RF switch is coupled to the transmit path and the receive path.

16. The electronic device of claim 5, wherein the user input event is at least one of a touch event or a hover event.

17. The electronic device of claim 5, further comprising:
analog-to-digital converter (ADC); and
a synchronization mechanism to synchronize operation of the RF switch with specified transmissions by the wireless communication component and associated sampling of the analog voltage signal by the ADC.

18. The electronic device of claim 17, wherein the specified transmissions comprise a plurality of advertisement packets transmitted via the antenna over a plurality of frequency channels during the first time window.

19. A method of operating a device, the method comprising:
sending one or more radio frequency (RF) signals to an antenna to radiate electromagnetic energy in a first time window;
activating an RF switch to couple an Antenna as Sensor (A2S) system of the device to the antenna for the first time window;
determining, using the A2S system, impedance data for the first time window representing impedance changes of the antenna captured by the A2S system;
determining, using the impedance data, a user input event caused by a presence of an object in proximity to the antenna; and
performing an action in response to the user input event.

20. The method of claim 19, wherein sending the RF signals comprises transmitting specified transmissions over the antenna over a plurality of frequency channels during the first time window, and wherein the method further comprises:
measuring and converting, using a detection circuit of the A2S system, the impedance changes of the antenna into an analog voltage signal; and
converting the analog voltage signal, by an analog-to-digital converter (ADC) of the A2S system, into the impedance data corresponding to the first time window.

* * * * *